(12) United States Patent
Ippoushi et al.

(10) Patent No.: US 7,810,551 B2
(45) Date of Patent: *Oct. 12, 2010

(54) VAPOR-LIFT PUMP HEAT TRANSPORT APPARATUS

(75) Inventors: Shigetoshi Ippoushi, Tokyo (JP); Nobuaki Uehara, Tokyo (JP); Akira Yamada, Tokyo (JP); Tetsuro Ogushi, Tokyo (JP); Hisaaki Yamakage, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 142 days.

This patent is subject to a terminal disclaimer.

(21) Appl. No.: 12/274,418

(22) Filed: Nov. 20, 2008

(65) Prior Publication Data

US 2009/0071631 A1 Mar. 19, 2009

Related U.S. Application Data

(60) Continuation of application No. 11/562,511, filed on Nov. 22, 2006, now abandoned, which is a division of application No. 10/755,311, filed on Jan. 13, 2004, now Pat. No. 7,201,215.

(30) Foreign Application Priority Data

Jan. 21, 2003 (JP) ............................. 2003-012262
Oct. 8, 2003 (JP) ............................. 2003-349965

(51) Int. Cl.
*F28D 15/00* (2006.01)
*F28F 13/06* (2006.01)

(52) U.S. Cl. .............................. 165/104.28; 165/104.24

(58) Field of Classification Search ............ 165/104.21, 165/104.22, 104.24, 104.28, 104.29, 108, 165/163; 126/635, 638
See application file for complete search history.

(56) References Cited

U.S. PATENT DOCUMENTS 1,935,053 A 6/1929 Jaeger (Continued)

FOREIGN PATENT DOCUMENTS

JP 52-98476 8/1977

(Continued)

OTHER PUBLICATIONS

JP 11-12696 U, 1936.

*Primary Examiner*—Tho V Duong
(74) *Attorney, Agent, or Firm*—Leydig, Voit & Mayer, Ltd.

(57) ABSTRACT

A vapor-lift pump heat transport apparatus having a small heat resistance and a large heat transport capacity. A heat exchange circulating solution container has a first space and a second space communicating with the first space through a communication opening and contains a heat exchange circulating solution, and vapor thereof, in each space. A circulating solution transport passage includes a pipe connected to the solution outlet of the container and provided with a sensible heat releasing heat exchanger, a pipe disposed in the container, and a pipe connected to a vapor-liquid two-phase fluid inlet and provided with a heating heat exchanger. A vapor-liquid two-phase fluid flows into only the first space through the vapor-liquid two-phase fluid inlet. When the entrance of the vapor-liquid two-phase fluid has caused a pressure difference between the first and second spaces, a difference occurs between the positions of the vapor-liquid interfaces in the first and second spaces.

8 Claims, 38 Drawing Sheets

U.S. PATENT DOCUMENTS

| | | | | |
|---|---|---|---|---|
| 1,900,715 A | * | 3/1933 | Jaeger | 549/248 |
| 2,220,295 A | | 11/1940 | Siedle | |
| 3,609,991 A | * | 10/1971 | Chu et al. | 62/333 |
| 3,749,158 A | * | 7/1973 | Szabo et al. | 165/96 |
| 4,061,131 A | | 12/1977 | Bohanon | |
| 4,246,890 A | * | 1/1981 | Kraus et al. | 126/636 |
| 4,270,521 A | | 6/1981 | Brekke | |
| 4,458,669 A | | 7/1984 | Lee | |
| 4,502,286 A | * | 3/1985 | Okada et al. | 62/119 |
| 4,552,208 A | | 11/1985 | Sorenson | |
| 4,653,579 A | | 3/1987 | Fujii et al. | |
| 4,986,348 A | | 1/1991 | Okayasu | |
| 5,195,577 A | * | 3/1993 | Kameda et al. | 165/104.13 |
| 5,203,399 A | | 4/1993 | Koizumi | |
| 5,351,488 A | * | 10/1994 | Sorensen | 60/641.11 |
| 6,564,861 B1 | * | 5/2003 | Miyazaki et al. | 165/104.29 |
| 7,201,215 B2 | * | 4/2007 | Ippoushi et al. | 165/104.24 |
| 7,721,793 B2 | * | 5/2010 | Ippoushi et al. | 165/104.24 |

FOREIGN PATENT DOCUMENTS

| | | |
|---|---|---|
| JP | 57-172190 A | 10/1982 |
| JP | 59-59681 U | 4/1984 |
| JP | 3-211392 A | 9/1991 |
| JP | 2000-180078 A | 6/2000 |
| JP | 2002-122392 A | 4/2002 |
| JP | 2003-41275 A | 2/2003 |

* cited by examiner

VAPOR-LIFT PUMP HEAT TRANSPORT APPARATUS

BACKGROUND OF THE INVENTION

1. Field of the Invention

The present invention relates to a heat transport apparatus. In particular, the invention relates to an vapor-lift pump (bubble pump) type heat transport apparatus that uses an vapor-lift pump and requires no external motive power.

2. Description of the Related Art

Conventionally, thermosyphons (i.e., heat pipes using gravity) are used as heat transport apparatus that use no external motive power. However, thermosyphons are limited in heat transport directions; in particular, it is difficult to perform downward heat transport. In these circumstances, a heat transport apparatus using an vapor-lift pump has been developed as a new heat transport apparatus (refer to JP-A-2002-122392, for example). As shown in FIG. 1 of JP-A-2002-122392, this heat transport apparatus is equipped with a heat exchange circulating solution container for containing a heat exchange circulating solution whose temperature is increased to a high temperature and high-temperature vapor produced from the heat exchange circulating solution by a phase change. The heat exchange circulating solution container is provided with a solution outlet and a vapor-liquid two-phase fluid inlet, and a circulating solution transport pipe is connected to the solution outlet and the vapor-liquid two-phase fluid inlet. The circulating solution transport pipe includes a solution outflow pipe that is connected to the solution outlet, an intra-container pipe that penetrates through the heat exchange circulating solution container, and a vapor-liquid two-phase fluid inflow pipe that is connected to the vapor-liquid two-phase fluid inlet. The solution outflow pipe is provided with a sensible heat releasing heat exchanger and the vapor-liquid two-phase fluid inflow pipe is provided with a heating heat exchanger.

The conventional heat transport apparatus having the above configuration, which transports heat from a high-temperature heat source to a heat sink utilizing a density difference that occurs in the heat exchange circulating solution in the circulating solution transport pipe due to a vapor-liquid phase change of the circulating solution, enables heat transport in an arbitrary direction without using external motive power.

However, the conventional heat transport apparatus has problems that a maximum heat transport capacity is small, the heat resistance is large (i.e., the heat characteristics are poor), and heat transport is difficult with a small temperature difference.

Another problem is that when the heat load is light the circulation flow rate of the heat exchange circulating solution that circulates through the circulating solution transport pipe intermits to cause vibration.

SUMMARY OF THE INVENTION

An object of the present invention is to solve the above problems and thereby provide an vapor-lift pump type heat transport apparatus having a small heat resistance and a large heat transport capacity. Another object of the invention is to provide a highly reliable vapor-lift pump type heat transport apparatus in which the circulation flow rate of a circulating solution does not tend to ripple.

An vapor-lift pump type heat transport apparatus according to a first aspect of the invention comprises a heat exchange circulating solution container that has a first space and a second space communicating with the first space through a communication opening formed in a bottom portion of the container, and that contains a heat exchange circulating solution and vapor thereof in each of the first space and the second space; a solution outlet through which a heat exchange circulating solution is output from the container; a vapor-liquid two-phase fluid inlet through which a vapor-liquid two-phase fluid consisting of a high-temperature heat exchange circulating solution and vapor bubbles thereof is input to only the first space of the container; and a circulating solution transport passage having a first transport passage connected to the solution outlet and provided with a sensible heat releasing heat exchanger, a second transport passage through which an inside, low-temperature heat exchange circulating solution exchanges heat with the heat exchange circulating solution in the first space or the heat exchange circulating solution and its vapor in the first space, and a third transport passage connected to the vapor-liquid two-phase fluid inlet and provided with a heating heat exchanger, each of the first and third transport passages being connected to the second transport passage.

In this vapor-lift pump type heat transport apparatus, the positions of the vapor-liquid interfaces in the two spaces vary passively in accordance with the magnitude of the heat load, whereby pressure increase in the apparatus can be suppressed. This provides an advantage that a heat transport apparatus having a large heat transport capacity can be obtained. A large amount of heat can be transported even with a small temperature difference. Further, the conditions relating to the withstand pressure design can be relaxed and hence the weight of the apparatus can be reduced.

An vapor-lift pump type heat transport apparatus according to a second aspect of the invention comprises a heat exchange circulating solution container that contains a heat exchange circulating solution and vapor thereof; a solution outlet through which the heat exchange circulating solution is output from the container; a vapor-liquid two-phase fluid inlet through which a vapor-liquid two-phase fluid consisting of a high-temperature heat exchange circulating solution and vapor bubbles thereof is input to the container; an opening that is formed in a top portion of the container and communicates with an environmental space of the container; and a circulating solution transport passage having a first transport passage connected to the solution outlet and provided with a sensible heat releasing heat exchanger, a second transport passage through which an inside, low-temperature heat exchange circulating solution exchanges heat with the heat exchange circulating solution in the container or the heat exchange circulating solution and its vapor in the container, and a third transport passage connected to the vapor-liquid two-phase fluid inlet and provided with a heating heat exchanger, each of the first and third transport passages being connected to the second transport passage.

This configuration makes it possible to provide an vapor-lift pump type heat transport apparatus having a small heat resistance and a large heat transport capacity.

An vapor-lift pump type heat transport apparatus according to a third aspect of the invention comprises a heat exchange circulating solution container that contains a heat exchange circulating solution and vapor thereof; a solution outlet through which the heat exchange circulating solution is output from the container; a solution inlet through which a heat exchange circulating solution is input to the container; and a circulating solution transport passage having a first transport passage connected to the solution outlet and provided with a sensible heat releasing heat exchanger, a second transport passage through which an inside heat exchange circulating solution exchanges heat with the heat exchange circulating solution in the container, and a third transport passage connected to the solution inlet and provided with a heating heat exchanger, each of the first and third transport passages being connected to the second transport passage. A portion of the third transport passage between the solution inlet and the heating heat exchanger is in contact with the second transport passage, and the heat exchange circulating solution inside the second transport passage exchanges heat with a heat exchange circulating solution inside the third transport passage and vapor bubbles thereof.

This configuration makes it possible to provide an vapor-lift pump type heat transport apparatus having a small heat resistance and a large heat transport capacity.

The foregoing and other objects, features, aspects, and advantages of the present invention will become more apparent from the following detailed description of the present invention when taken in conjunction with the accompanying drawings.

DETAILED DESCRIPTION OF THE INVENTION

Embodiment 1

Figure 1:
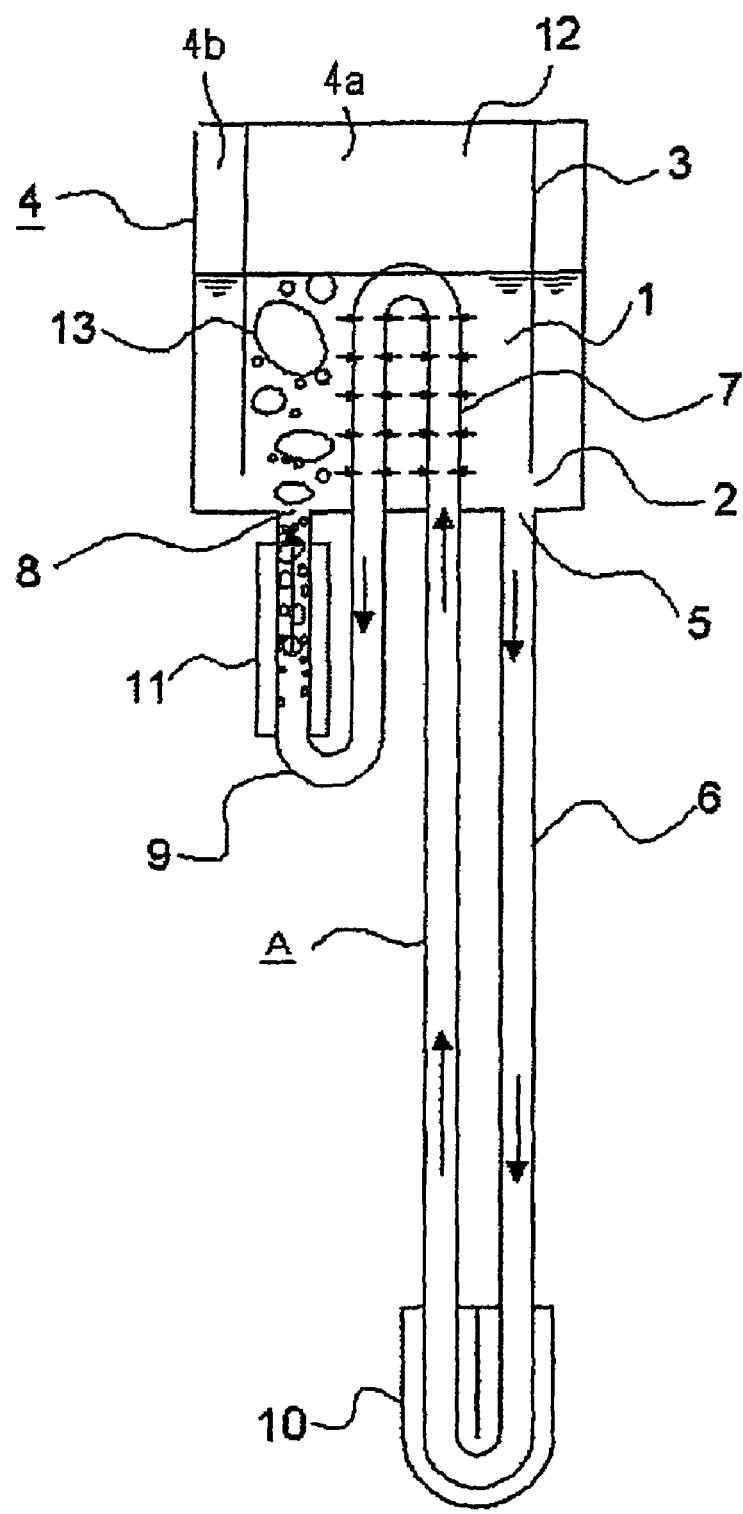
FIG. 1 is a sectional view showing the configuration of an vapor-lift pump type heat transport apparatus according to a first embodiment of the present invention.

The above-described conventional heat transport apparatus has such problems as a small maximum heat transport capacity and a large heat resistance. However, the present invention has been made by revealing that these problems are caused by a pressure increase in the container.

As the heat load increases, a large amount of vapor bubbles generated in the heating heat exchanger comes to flow into the heat exchange circulating solution container. Since the heat exchange capability of the outer surface of the intra-container pipe is small, the vapor bubbles cannot condense sufficiently and hence the pressure inside the apparatus increases. As a result, the saturation temperature inside the apparatus increases and the difference between the temperatures inside and outside the intra-container pipe becomes large. Since the temperature difference between the heating heat exchanger and the sensible heat releasing heat exchanger increases, the heat resistance of the apparatus is much deteriorated (increased). Heat cannot be transported unless the difference between the temperatures inside and outside the intra-container pipe is large; that is, heat transport is difficult with a small temperature difference. Further, the maximum heat transport capacity becomes small because of a heat transport limit that is caused by the increase of the pressure inside the container. This will be described below more specifically. The saturation temperature increases as the pressure inside the container increases. As the saturation temperature increases, the ratio of the increase of the saturation pressure to the increase of the saturation temperature becomes larger and hence the pressure inside the apparatus increases rapidly with the increase of the heat load. On the other hand, the conventional vapor-lift pump type heat transport apparatus transports heat utilizing buoyancy that is produced by a density difference occurring in the heat exchange circulating solution. As the pressure inside the apparatus increases, the density of vapor bubbles generated increases and resulting decrease in the volumes of the vapor bubbles makes it difficult to obtain high buoyancy. This lowers the circulation flow rate of the solution and in turn decreases the heat exchange capability through the intra-container pipe. As a result, the saturation temperature increases and the pressure inside the apparatus increases further. A heat transport limit that is caused by the increased pressure inside the apparatus that results from the above vicious circle decreases the maximum heat transport capacity. A further increase of the pressure inside the apparatus may even destroy the apparatus.

An vapor-lift pump type heat transport apparatus according to this embodiment is characterized in being configured so as to minimize the probability that the pressure inside the apparatus reaches such a value as to start the above-described vicious cycle; that is, it is configured so as to be able to suppress increase of the pressure inside the apparatus. Further, the heat exchange capability through the intra-container pipe is increased to lower the pressure increase rate with respect to the heat load, which makes it possible to increase the maximum heat transport capacity.

The first embodiment of the invention will be hereinafter described with reference to the drawings.

FIG. 1 is a sectional view showing the configuration of an vapor-lift pump (bubble pump) type heat transport apparatus according to the first embodiment of the invention. As shown in FIG. 1, a heat exchange circulating solution container 4 contains a heat exchange circulating solution 1 whose temperature is increased to a high temperature and high-temperature vapor 12 produced from the solution 1 by a phase change and retains latent heat. A partition 3 is provided in the heat exchange circulating solution container 4 and divides the space inside the container 4 into a first space 4a and a second space 4b. The first space 4a and the second space 4b communicate with each other via an opening 2 or a gap (i.e., a communication opening). Because of the opening 2, the heat exchange circulating solution 1 occupies parts of the first space 4a and the second space 4b. That is, the first space 4a and the second space 4b communicate with each other via the opening 2 that is located in the space that is filled with the heat exchange circulating solution 1, and do not communicate with each other in the space that is occupied by the high-temperature vapor 12 (i.e., a vapor space). The heat exchange circulating solution container 4 is provided with a vapor-liquid two-phase fluid inlet 8 and a solution outlet 5 through which to send out a heat exchange circulating solution 1 from the container 4. A vapor-liquid two-phase fluid consisting of a heat exchange circulating solution 1 whose temperature has been increased to a high temperature and vapor bubbles 13 that have been produced from the heat exchange circulating solution 1 that has been increased in temperature and boiled flows into the container 4 through the vapor-liquid two-phase fluid inlet 8. The vapor-liquid two-phase fluid entering the container 4 through the vapor-liquid two-phase fluid inlet 8 goes into only the first space 4a and does not go into the second space 4b. As described above, the first space 4a and the second space 4b communicate with each other through the opening 2 and the heat exchange circulating solution 1 can freely move between them. Therefore, when a pressure difference has occurred between the first space 4a and the second space 4b by entrance of a vapor-liquid two-phase fluid into the first space 4a, the vapor-liquid interface positions of the first space 4a and the second space 4b can easily vary due to the pressure difference.

It is preferable that the heat exchange circulating solution 1 be a fluid that is superior in heat characteristics (e.g., the heat conductivity is high and the specific heat is large), is fluidity (e.g., the viscosity coefficient is small), and has a large liquid-to-vapor density ratio. Examples of the heat exchange circulating solution 1 are single-component liquids such as distilled water, alcohol, and a liquid metal, water solutions such as an antifreeze solution and a water solution of alcohol, and mixed liquids such as a magnetic fluid all of which are capable of vapor-liquid phase change. The vapor 12 is produced by vaporization of the heat exchange circulating solution 1 or part of its components. Alternatively, a non-condensing gas such as air may be mixed into the heat exchange circulating solution 1.

A circulating solution transport pipe A is connected to the solution outlet 5 and the vapor-liquid two-phase fluid inlet 8 of the heat exchange circulating solution container 4 to form a circulating solution transport passage through which the heat exchange circulating solution 1 circulates.

The circulating solution transport pipe A includes a solution outflow pipe (first transport passage) 6 that is connected to the solution outlet 5, an intra-container pipe (second transport passage) 7 that goes through the first space 4a of the heat exchange circulating solution container 4, and a vapor-liquid two-phase fluid inflow pipe (third transport passage) 9 that is connected to the vapor-liquid two-phase fluid inlet 8. A heat exchange circulating solution 1 goes out of the heat exchange circulating solution container 4, goes through the solution outflow pipe 6, the intra-container pipe 7, and the vapor-liquid two-phase fluid inflow pipe 9, and returns to the container 4.

The solution outflow pipe 6 of the circulating solution transport pipe A is provided with a sensible heat releasing heat exchanger 10. A circulating solution 1 going through the solution outflow pipe 6 releases heat to the sensible heat releasing heat exchanger 10 through the pipe wall. The vapor-liquid two-phase fluid inflow pipe 9 is provided with a heating heat exchanger 11. A circulating solution 1 going through the solution outflow pipe 6 absorbs heat from, that is, is heated by, the heating heat exchanger 11 through the pipe wall.

The heating heat exchanger 11 is a heat emission portion of a heating body of an electronic apparatus or the like or a heat emission portion of an apparatus for transporting heat from the heating body. The sensible heat releasing heat exchanger 10 is a heat receiving portion of a heat transport apparatus such as a heat pipe or a heat emission wall utilizing natural or forced convection heat transmission, radiation, or the like. Alternatively, each of the vapor-liquid two-phase fluid inflow pipe 9 which is provided with the heating heat exchanger 11 and the solution outflow pipe 6 which is provided with the sensible heat releasing heat exchanger 10 may be exposed directly to an arbitrary space (e.g., the air, water, or soil) and be heated or release heat by heat conduction, natural or forced convection heat transmission, radiation, or the like. Fins or the like may be provided on a heat emission wall or the outer surface of its exposed portion. A wind received during running may be used for cooling the sensible heat releasing heat exchanger 10.

A plurality of heating heat exchangers 11 and/or a plurality of sensible heat releasing heat exchangers 10 may be disposed along the flow passage.

The circulating solution transport pipe A is the passage for transporting the heat exchange circulating solution 1 and is a circular pipe, an elliptical pipe, a rectangular pipe, a corrugated pipe (i.e., flexible pipe), or the like. In the circulating solution transport pipe A, the wall surfaces of the vapor-liquid two-phase fluid in flow pipe 9 which is provided with the heating heat exchanger 11, the solution outflow pipe 6 which is provided with the sensible heat releasing heat exchanger 10, and the intra-container pipe 7 serve as heat transmission wall surfaces. A turbulence promotion body, a swirl flow promotion body (e.g., twisted tape), fins, or the like for promotion of heat transmission may provided inside each pipe. Or a spiral pipe or a snaked pipe may be used as each pipe to increase the heat transmission area per unit volume. The intra-container pipe 7 serves for heat exchange between the heat exchange circulating solution 1 in the intra-container pipe 7 and the heat exchange circulating solution 1 and the vapor 12 outside the intra-container pipe 7. Fins or the like may be provided on the outer surface of the intra-container pipe 7.

Next, the operation of the heat transport apparatus according to the embodiment will be described. A heat exchange circulating solution 1 contained in the heat exchange circulating solution container 4 and retaining high-temperature heat goes out of the container, flows through the circulating solution transport pipe A, and returns to the container 4 to complete one circulation through the apparatus. In passing through the solution outflow pipe 6 of the circulating solution transport pipe A, the heat exchange circulating solution 1 releases sensible heat to the sensible heat releasing heat exchanger 10 (i.e., heat exchanged is performed) and is thereby cooled to a low temperature. Then, in passing through the intra-container pipe 7, the heat exchange circulating solution 1 is preliminarily heated by the high-temperature heat exchange circulating solution 1 contained in the first space 4a or the high-temperature heat exchange circulating solution 1 and the vapor 12 produced from the circulating solution 1 and is thereby increased in temperature. The temperature-increased heat exchange circulating solution 1 is further increased in temperature by the heating heat exchanger 11 attached to the vapor-liquid two-phase fluid inflow pipe 9 and is thereby boiled. The heat exchange circulating solution 1 then returns to the heat exchange circulating solution container 4 while generating vapor bubbles 13. After returning to the heat exchange circulating solution container 4, the heat exchange circulating solution 1 again flows through the circulating solution transport pipe A and during that course it is cooled, preliminarily heated, and increased in temperature to the boiling temperature.

In the heat transport apparatus according to this embodiment, the heat exchange circulating solution 1 is circulated through the apparatus by utilizing the density difference (i.e., the buoyancy due to the density difference) that is caused in the circulating solution transport pipe A by the phase change of the heat exchange circulating solution 1. That is, the heat exchange circulating solution 1 is circulated by utilizing the difference between the apparent density of the vapor-liquid two-phase fluid in the portion of the vapor-liquid two-phase fluid inflow pipe 9 from the heating heat exchanger 11 to the vapor-liquid two-phase fluid inlet 8 and the density of the heat exchange circulating solution 1 in the portion of the circulating solution transport pipe A in the same height range as the above portion of the vapor-liquid two-phase fluid inflow pipe 9. As the above circulation is repeated, high-temperature heat transmitted from the heating heat exchanger 11 is transported to the sensible heat releasing heat exchanger 10 and heat is transported from the sensible heat releasing heat exchanger 10 to another apparatus or a heat sink.

In the heat transport apparatus according to the embodiment, during the heat transport, as the amount of heat (i.e., heat load) transmitted from the heating heat exchanger 11 to the heat exchange circulating solution 1 increases, the amount of vapor bubbles 13 entering the heat exchange circulating solution container 4 increases and the amount of vapor 12 in the first space 4a increases. However, the position of the vapor-liquid interface is self-adjusted by virtue of the presence of the second space 4b that communicates with the first space 4a, which prevents increase of the pressure inside the first space 4a. Since the position of the vapor-liquid interface varies, the portion that exchanges heat with the vapor 12 in the container 4 increases to enhance the condensation capability, whereby the increase of the pressure inside the apparatus can be suppressed. Since the increase of the saturation temperature in the apparatus is thereby suppressed, the temperature difference between the heating heat exchanger 11 and the sensible heat releasing heat exchanger 10 is kept low and heat transport with a small temperature difference is facilitated. Further, since the increase of the pressure inside the first space 4a is suppressed, the decrease of the maximum heat transport capacity can be suppressed. Still further, since the increase of the pressure inside the heat exchange circulating solution container 4 is suppressed, it is not necessary to make the outer walls of the container 4 and the pipes thick, which enables weight reduction of the apparatus.

Figure 2:
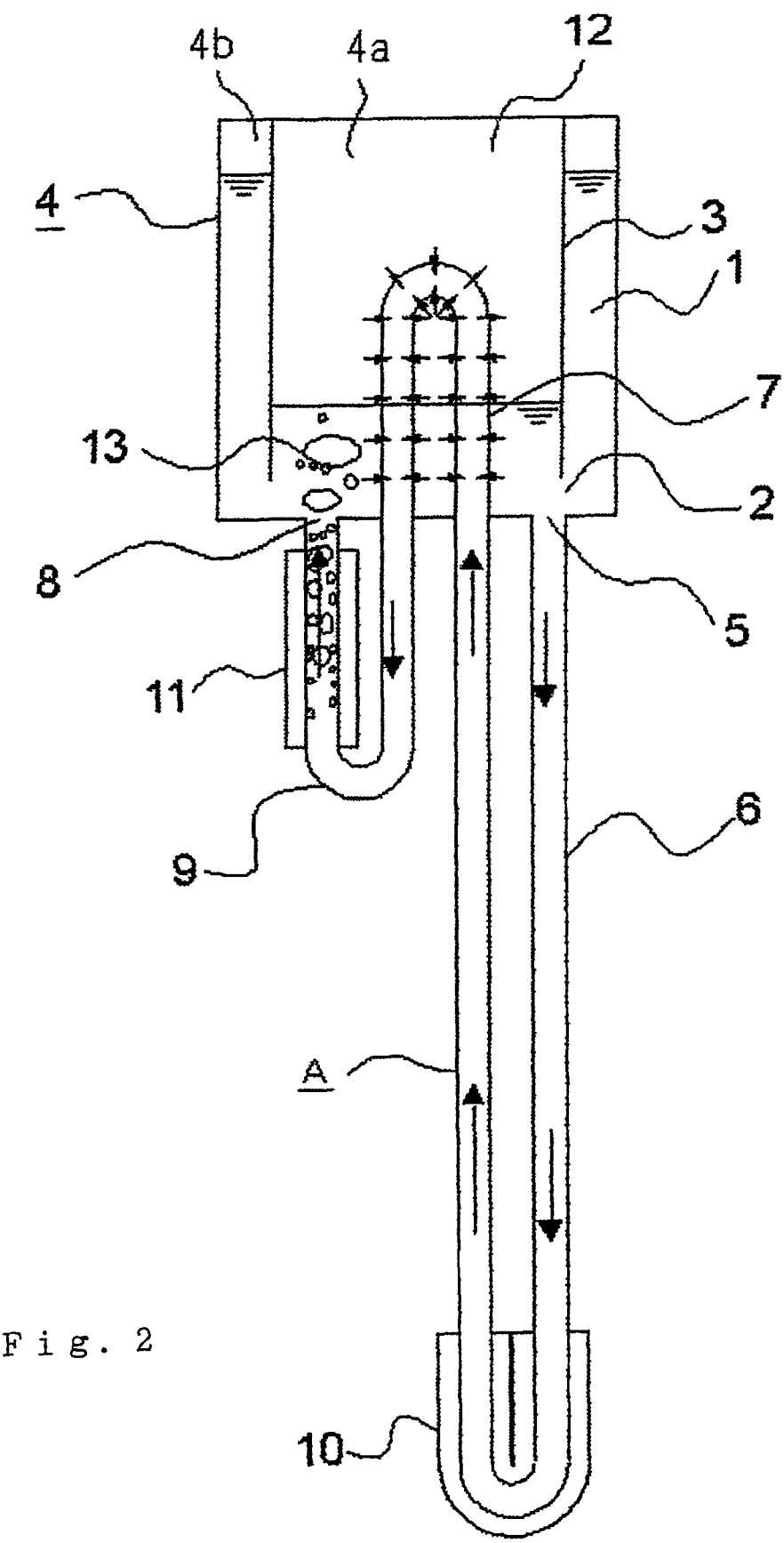
FIG. 2 is a sectional view of the vapor-lift pump type heat transport apparatus according to the first embodiment in a heavy heat load state.

As the amount of heat (i.e., heat load) transmitted from the heating heat exchanger 11 to the heat exchange circulating solution 1 increases, the position of the vapor-liquid interface between the first space 4a and the second space 4b is self-adjusted. That is, as shown in FIG. 2, the vapor-liquid interface in the first space 4a that contains the intra-container pipe 7 lowers and the vapor-liquid interface in the second space 4b that does not contain the intra-container pipe 7 rises. As a result, the contact area between the intra-container pipe 7 and the vapor 12 increases, that is, the area of the portion where heat exchange is performed in the form of condensation heat transmission, which is highly efficient, increases. The heat resistance of the heat exchange involving the intra-container pipe 7 is thus decreased.

In the conventional heat transport apparatus, the circulation flow rate of the circulating solution ripples when the heat load is light. This is because in the conventional heat transport apparatus, a part of the intra-container pipe is always located above the vapor-liquid interface in the heat exchange circulating solution container. That is, in the space above the vapor-liquid interface, the pressure inside the intra-container pipe is lower than the pressure inside the heat exchange circulating solution container. Therefore, the heat exchange circulating solution in the intra-container pipe boils easily. Generated vapor bubbles impair the flow of the heat exchange circulating solution through the circulating solution transport pipe and cause a ripple in the circulation flow rate. Further, since the contact area between the intra-container pipe and the vapor is large, if the heat load is light and the flow of the circulating liquid is slow, the heat exchange in the intra-container becomes so efficient as to cause a boil in the intra-container pipe. Generated vapor bubbles impair the flow of the heat exchange circulating solution through the circulating solution transport pipe and cause a ripple in the circulation flow rate.

In contrast, in this embodiment, as shown in FIG. 1, in an initial state of heat transport all or most of the intra-container pipe 7 is in contact with the heat exchange circulating solution 1 (i.e., the intra-container pipe 7 is not in contact with the vapor 12 at all or only a small part of the former is in contact with the latter). That is, the intra-container pipe (second transport passage) 7 is provided so that at least in an initial state of heat transport it is located under the vapor-liquid interface in the first space or its top is in contact with the vapor-liquid interface. With this measure, the above state is maintained while the heat load is light. Since the difference between the pressure inside the heat exchange circulating solution container 4 and the pressure inside the intra-container pipe 7 is small and the heat exchange capability through the intra-container pipe 7 is weak, a boil does not tend to occur in the intra-container pipe 7 and the circulation flow rate is not apt to ripple. When the heat load is heavy, as heat transport proceeds, the intra-container pipe 7 comes to contact the vapor 12 as shown in FIG. 2 and the heat exchange capability increases. However, since the circulating solution flows fast and its temperature is relatively low, the probability that the heat exchange with the vapor 12 through the intra-container pipe 7 causes a boil is very low.

Figure 3:
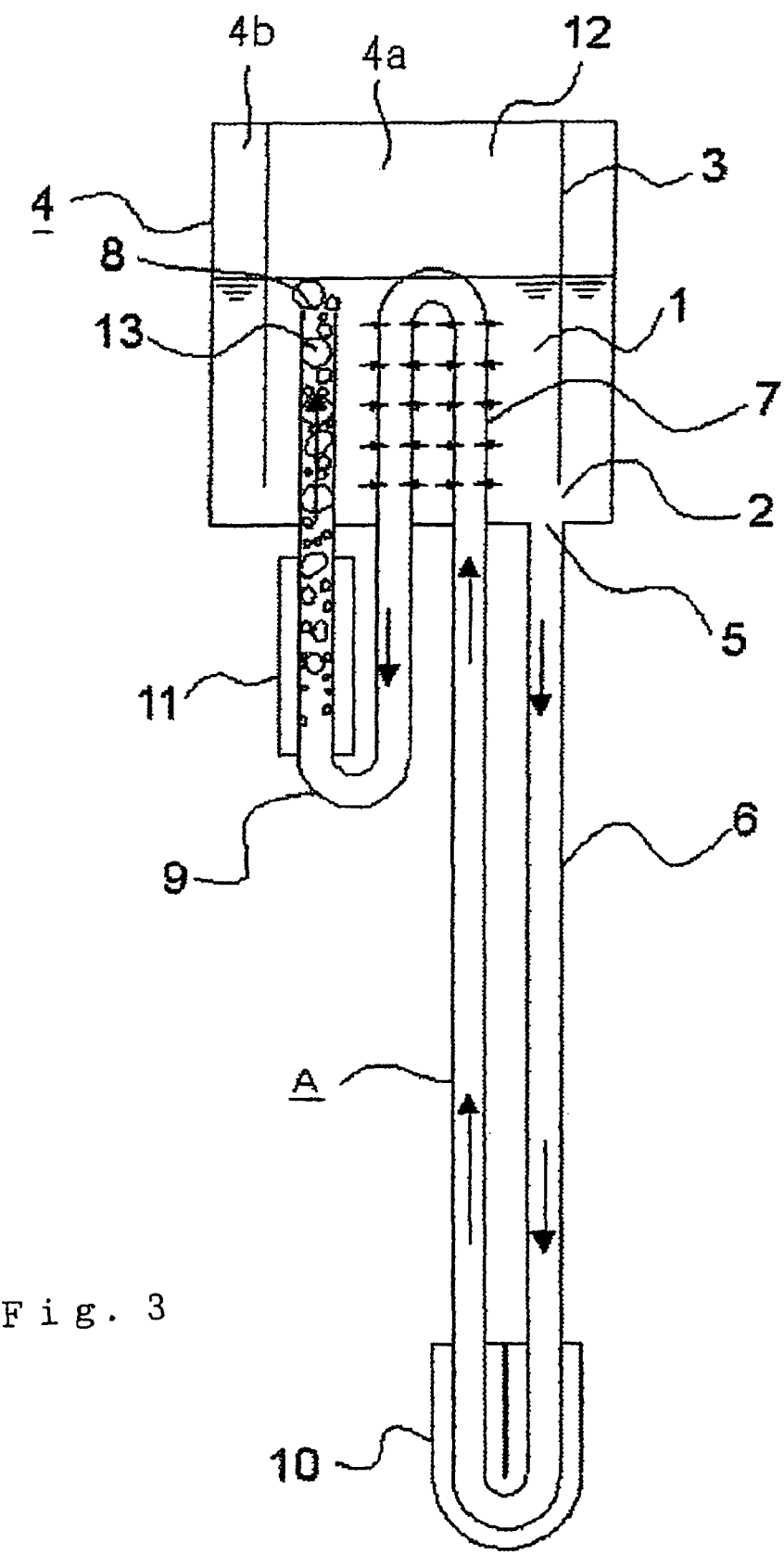
FIG. 3 is a sectional view showing the configuration of another vapor-lift pump type heat transport apparatus according to the first embodiment.

In this embodiment, the vapor-liquid two-phase fluid inflow pipe 9 may project into the first space 4a as shown in FIG. 3. In this case, the vapor-liquid two-phase fluid inlet 8 of the pipe 9 should always be located under the vapor-liquid interface in the first space 4a, that is, it should be located in the heat exchange circulating solution 1. As the heat exchange circulating solution container 4 is made longer in the vertical direction and the vapor-liquid two-phase fluid inflow pipe 9 is made longer, the density difference increases, whereby the driving force for circulating the heat exchange circulating solution 1 is made stronger and the heat transport capacity is increased. However, if the vapor-liquid two-phase fluid inflow pipe 9 is too long, the pressure loss becomes unduly large: the vapor-liquid two-phase fluid inflow pipe 9 should be designed so as to have an optimum length with this point taken into consideration.

The solution outlet 5 is to send out a heat exchange circulating solution 1. If vapor bubbles 13 enter the solution outflow pipe 6 together with the heat exchange circulating solution 1, buoyancy is created in the direction opposite to the circulation direction of the heat exchange circulating solution 1 to lower its circulation flow rate. To prevent vapor bubbles 13 from entering the solution outflow pipe 6, it is preferable to provide the solution outlet 5 with a wire net or an obstruction plate whose mesh size is the same as or smaller than vapor bubbles 13.

In this embodiment, with regard to the positional relationships between the heat exchange circulating solution container 4, the sensible heat releasing heat exchanger 10, and the heating heat exchanger 11, the only requirement is that the heating heat exchanger 11 be located below the heat exchange circulating solution container 4. Except for this requirement, they may have different positional relationships than described above. For example, the sensible heat releasing heat exchanger 10 may be located above the heating heat exchanger 11 and the heat exchange circulating solution container 4.

Figure 4:
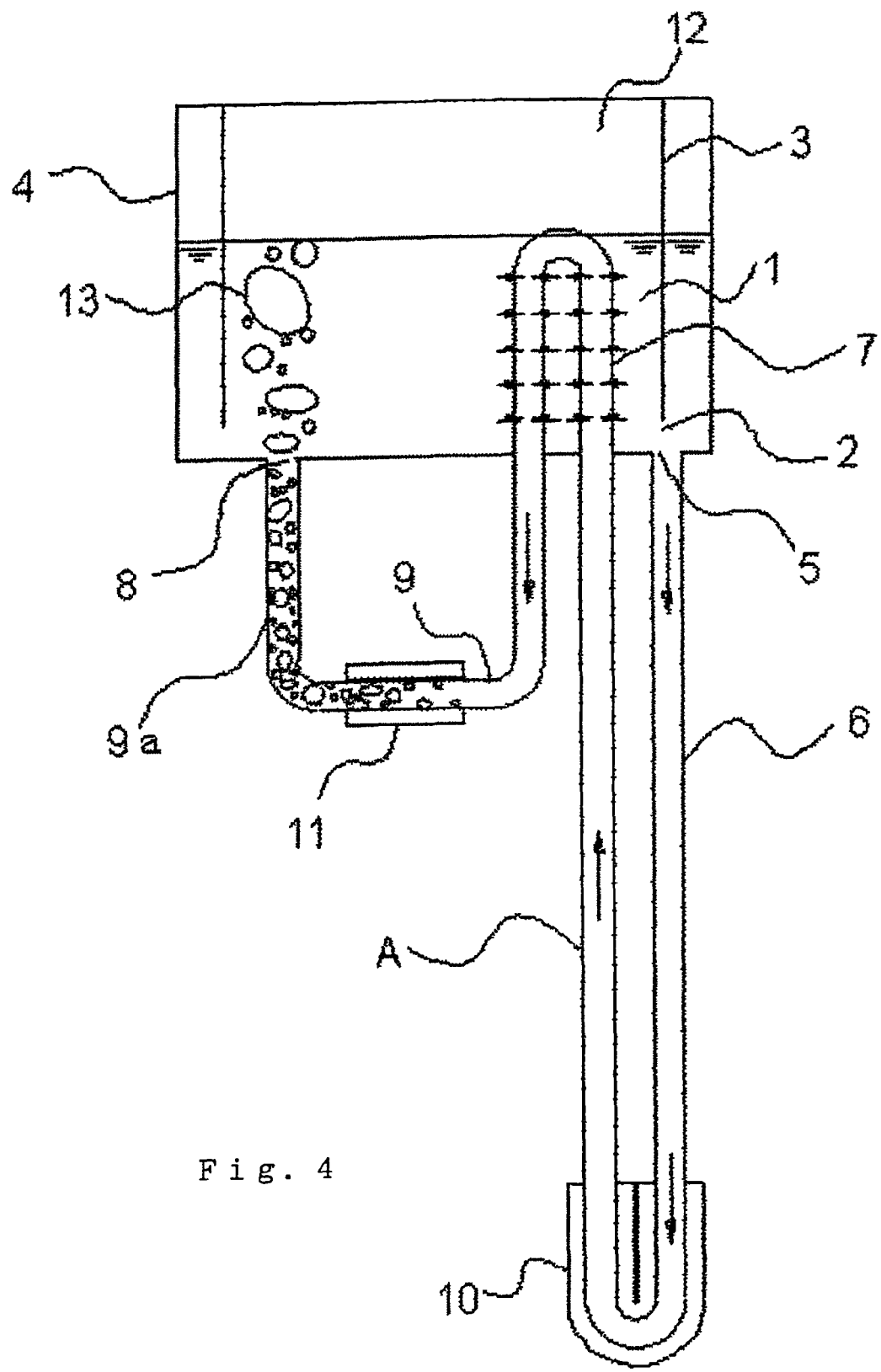
FIG. 4 is a sectional view showing the configuration of a further vapor-lift pump type heat transport apparatus according to the first embodiment.

If the distance between the heating heat exchanger 11 and the vapor-liquid two-phase fluid inlet 8 of the heat exchange circulating solution container 4 is sufficiently long, the buoyancy acting on the heat exchange circulating solution 1 in this pipe portion 9a enables circulation of the heat exchange circulating solution 1. Therefore, the heating heat exchanger 11 can be oriented horizontally. FIG. 4 is a sectional view showing the configuration of an vapor-lift pump type heat transport apparatus in which the heating heat exchanger 11 is oriented horizontally. This enables heat transport from a horizontal surface.

In this case, it is even preferable that the outlet-side portion of the heating heat exchanger 11 be slightly inclined upward.

Although, in FIG. 4, a boil starts in the portion of the pipe 9 to which the heating heat exchanger 11 is attached, there may occur a case that a boil starts in the pipe 9a (called flash vaporization) rather than in that portion of the pipe 9. The flash vaporization occurs in the following manner. A boil does not occur in a low region because of a high pressure head. As the position goes upward, the pressure head decreases (and becomes lower than the saturation pressure of the solution 1). A boil starts somewhere in a high region. Even in this case, the buoyancy acting on the heat exchange circulating solution 1 in the pipe 9a enables the solution 1 to circulate. Therefore, the heating heat exchanger 11 can be oriented horizontally.

In this embodiment, it is preferable that the vapor space of the first space 4a not communicate with the environmental space (i.e., the external air). In contrast, the vapor space of the second space 4b may communicate with the environmental space.

The partition 3 serves for heat exchange between the first space 4a and the second space 4b. Fins or the like may be provided on both surfaces of the partition 3.

As described above, in the heat transport apparatus according to the first embodiment, the heat exchange circulating solution 1 is circulated continuously through the apparatus by utilizing the density difference occurring in the solution 1 without using external motive power. Therefore, a large amount of heat can be transported in every direction (e.g., in the horizontal direction, upward, or downward). Long-distance transport is also enabled. Since no pump or the like having a movable portion is used, the apparatus is highly durable and reliable, compact, and light.

Further, since the inside space of the heat exchange circulating solution container 4 is divided by the partition 3 having the opening 2 and pressure increase in the apparatus is thereby suppressed automatically, the heat resistance is small and the heat transport capacity is increased. A large amount of heat can be transported even in the case where the temperature difference between the heating heat exchanger 11 and the sensible heat releasing heat exchanger 10 is small. Since the position of the vapor-liquid interface is self-adjusted in accordance with the heat load, heat can be transported stably in a wide load range from a light heat load to a heavy heat load.

Embodiment 2

Figure 5:
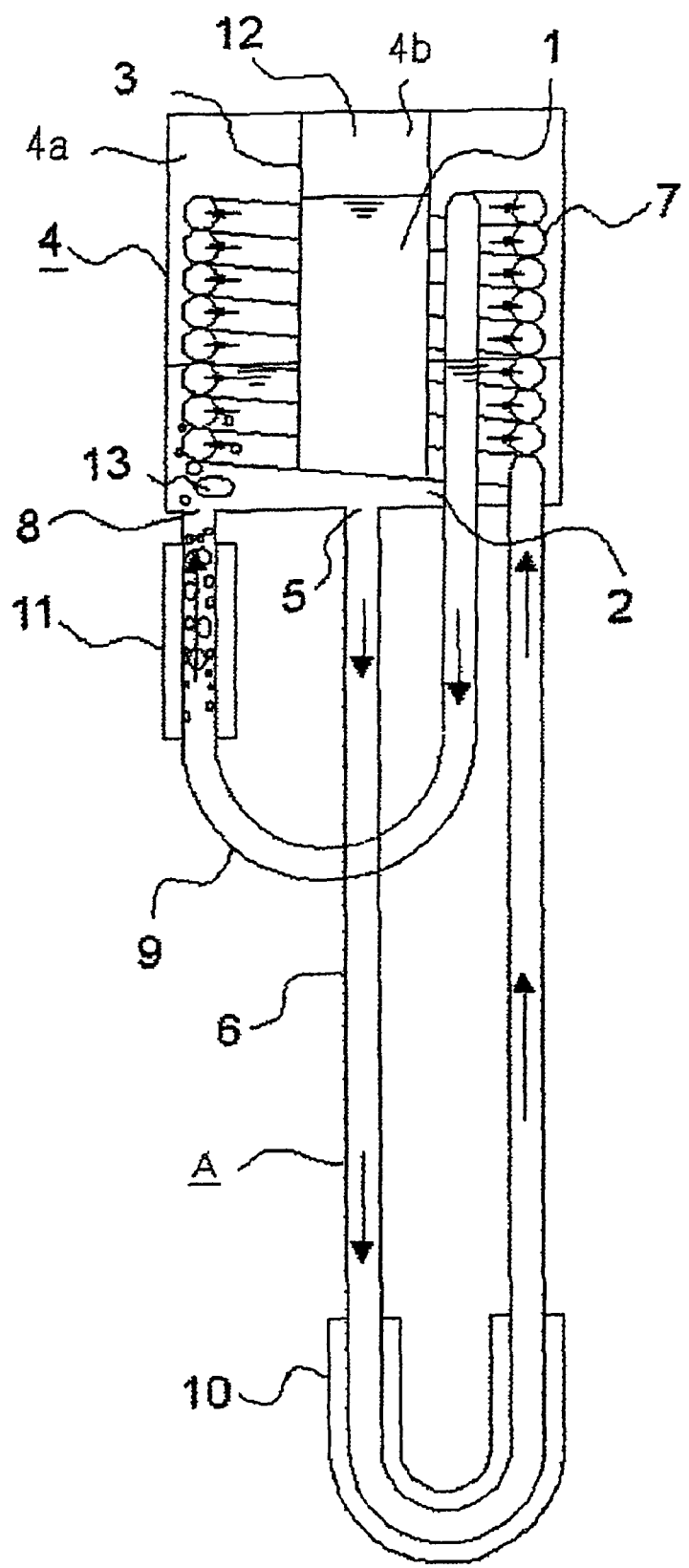
FIG. 5 is a sectional view showing the configuration of an vapor-lift pump type heat transport apparatus according to a second embodiment of the invention.

FIG. 5 is a sectional view showing the configuration of an vapor-lift pump type heat transport apparatus according to a second embodiment of the invention. In the embodiments of the invention, the same components or components corresponding to each other are given the same reference symbol. As shown in FIG. 5, as in the first embodiment, the heat exchange circulating solution container 4 is divided by the partition 3 into the first space 4a and the second space 4b. However, in the second embodiment, the first space 4a is the outside space and the intra-container pipe 7 is provided spirally in the first space 4a so as to surround the inside second space 4b. Even with this configuration, the same advantages as in the first embodiment can be provided.

Figure 6:
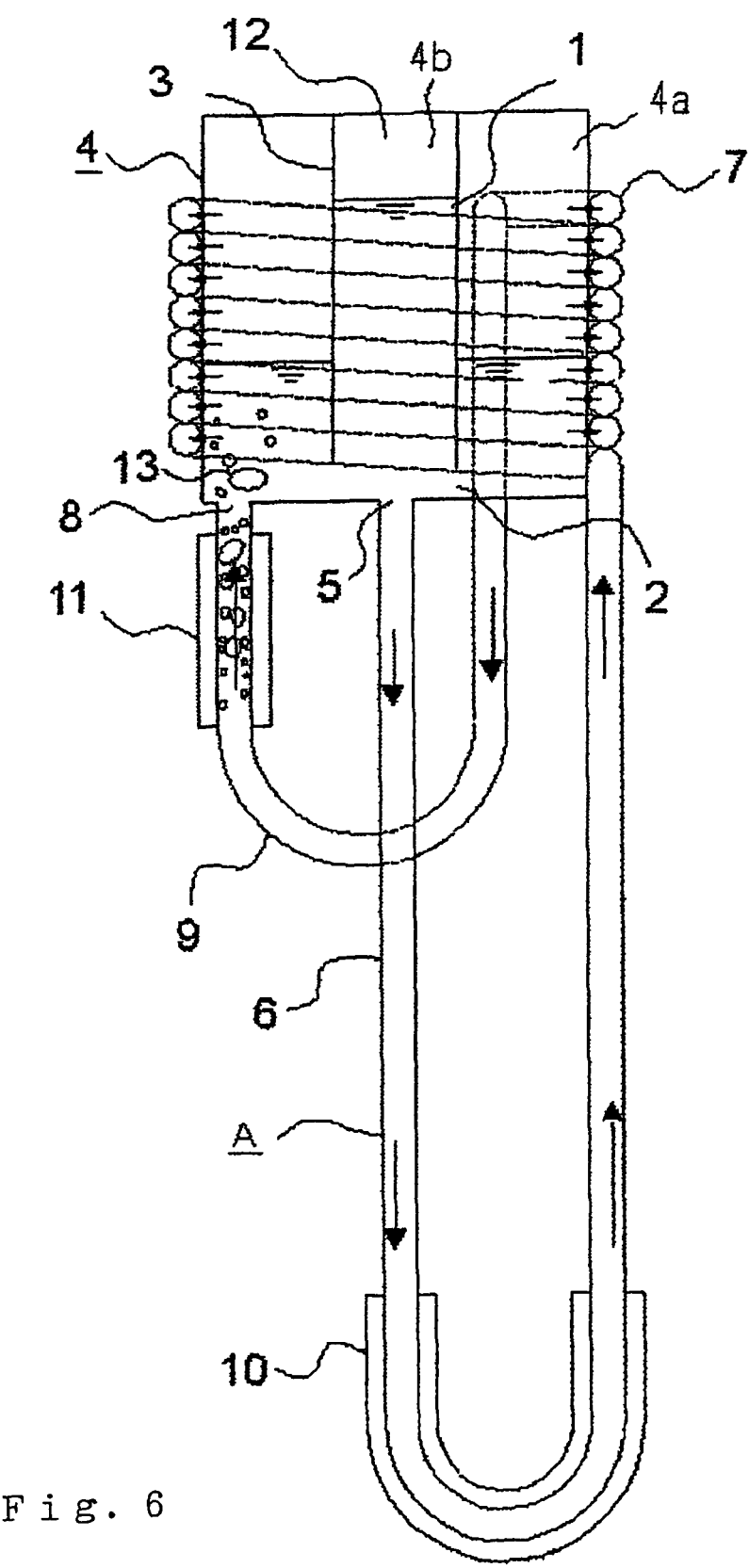
FIG. 6 is a sectional view showing the configuration of another vapor-lift pump type heat transport apparatus according to the second embodiment.

FIG. 6 is a sectional view showing the configuration of another vapor-lift pump type heat transport apparatus according to the second embodiment. As shown in FIG. 6, the heat exchange circulating solution container 4 is divided by the partition 3 into the first space 4a and the second space 4b and, as in the case of FIG. 5, the first space 4a is the outside space. However, the intra-container pipe 7 is provided spirally adjacent to the container outer wall that defines the first space 4a so as to surround the first space 4a. Even with this configuration, the heat exchange circulating solution 1 that flows through the intra-container pipe 7 can exchange heat with the heat exchange circulating solution 1 in the first space 4a or the heat exchange circulating solution 1 in the first space 4a and the vapor 12 produced from the solution 1. This apparatus can provide the same advantages as the apparatus of FIGS. 1 and 5.

In the apparatus of FIGS. 5 and 6, it is possible to make the solution 1 in the intra-container pipe 7 not prone to boil and to make the circulation flow rate not apt to ripple by adjusting the vapor-liquid interface in the container 4 so that all or most of the intra-container pipe 7 exchanges heat only with the heat exchange circulating solution 1 in the first space 4a in an initial state of heat transfer.

Embodiment 3

Figure 7:
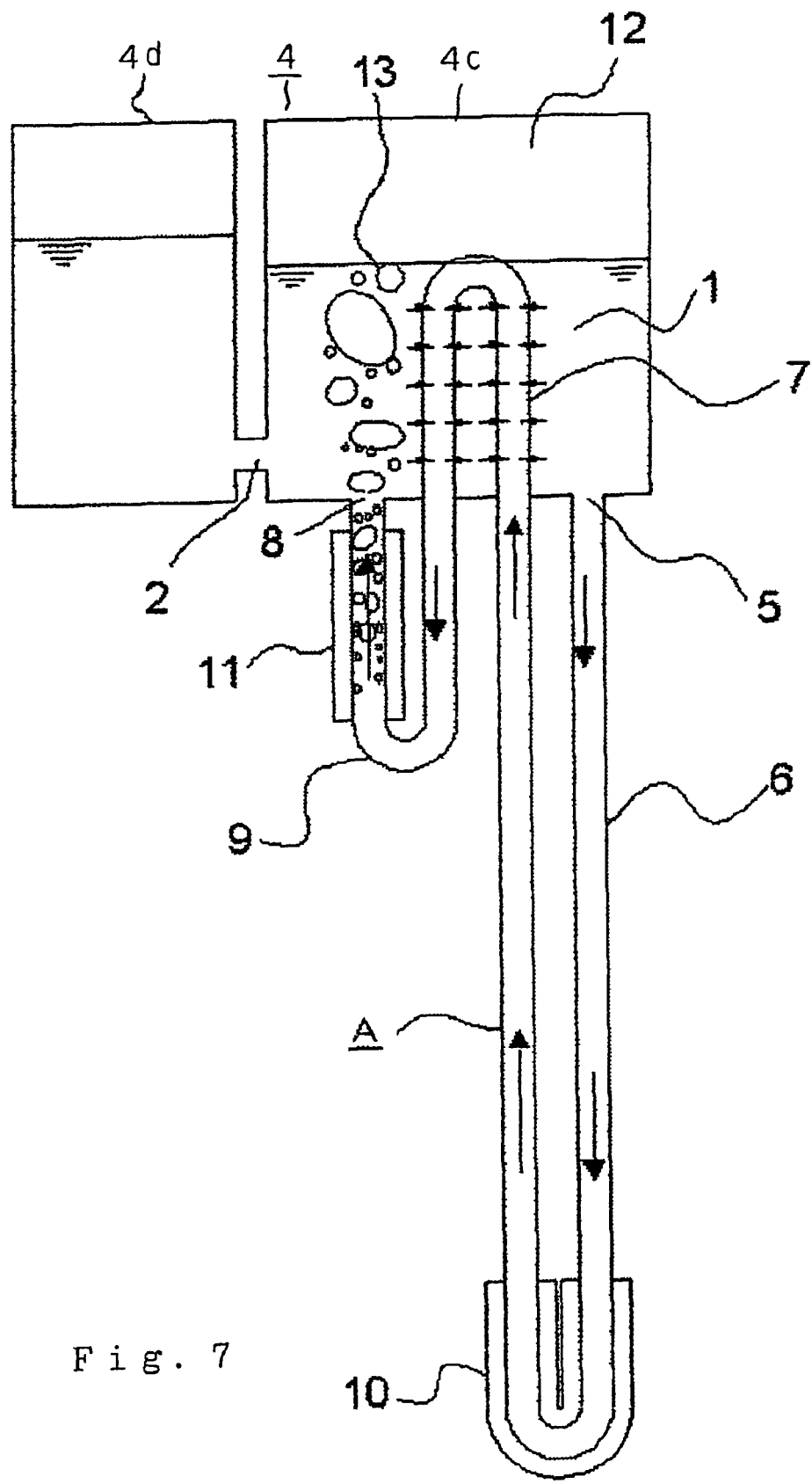
FIG. 7 is a sectional view showing the configuration of an vapor-lift pump type heat transport apparatus according to a third embodiment of the invention.
Figure 8:
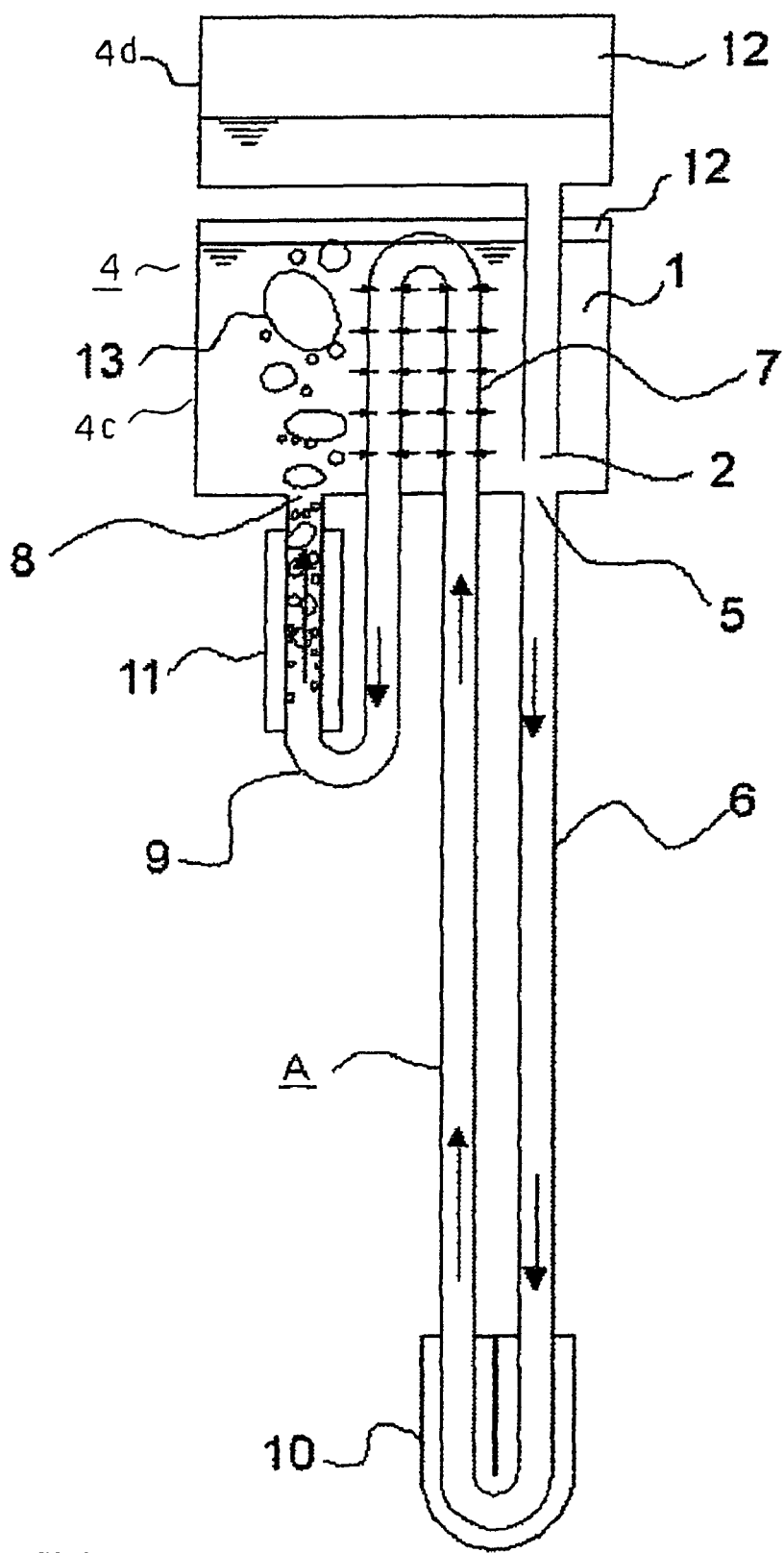
FIG. 8 is a sectional view showing the configuration of another vapor-lift pump type heat transport apparatus according to the third embodiment.

FIG. 7 is a sectional view showing the configuration of an vapor-lift pump type heat transport apparatus according to a third embodiment of the invention. FIG. 8 is a sectional view showing the configuration of another vapor-lift pump type heat transport apparatus according to the third embodiment. As shown in FIGS. 7 and 8, this apparatus is not such that the internal space of the heat exchange circulating solution container 4 is divided by the partition 3. Instead, a second heat exchange circulating solution container 4d is provided outside a first heat exchange circulating solution container 4c and connected to the container 4c. The first heat exchange circulating solution container 4c and the second heat exchange circulating solution container 4d perform functions corresponding to the functions of the first space 4a and the second space 4b of the first embodiment, respectively.

As for the location of the second heat exchange circulating solution container 4d, the only requirement is that it should be connected to a bottom portion of the first heat exchange circulating solution container 4c except the portion to which the vapor-liquid two-phase fluid inflow pipe 9 is connected which is provided between the first heat exchange circulating solution container 4c and the heating heat exchanger 11. The location of the second heat exchange circulating solution container 4d is not limited to the locations shown in FIGS. 7 and 8.

Even with the above configuration, as in the first embodiment, the increase of the internal pressure and hence the increase the system saturation temperature can be suppressed and the heat resistance can be reduced. Absent complicated work of placing the partition 3 in the heat exchange circulating solution container 4, the apparatus can be manufactured easily.

The temperature inside the second heat exchange circulating solution container 4d may be controlled by providing a heating device such as a heater in the second heat exchange circulating solution container 4d or on its outer wall surface, in which case the internal pressure of the first heat exchange circulating solution container 4c can be adjusted, the boiling temperature inside the heating heat exchanger 11 can be controlled, and the temperature of the heating heat exchanger 11 can be adjusted.

There may occur a case that good results are obtained by confining a non-condensing gas such as air in the second heat exchange circulating solution container 4d and adjusting the pressure inside the first heat exchange circulating solution container 4c utilizing the expansion and contraction of the non-condensing gas. Where a heater is provided on the outer wall surface of the container 4d, a porous member such as a wire net may be attached to its inner wall surface, in which case the internal wall surface is always kept wetted with the heat exchange circulating solution and hence temperature increase due to drying of the internal wall surface of the container 4d.

Embodiment 4

Figure 9:
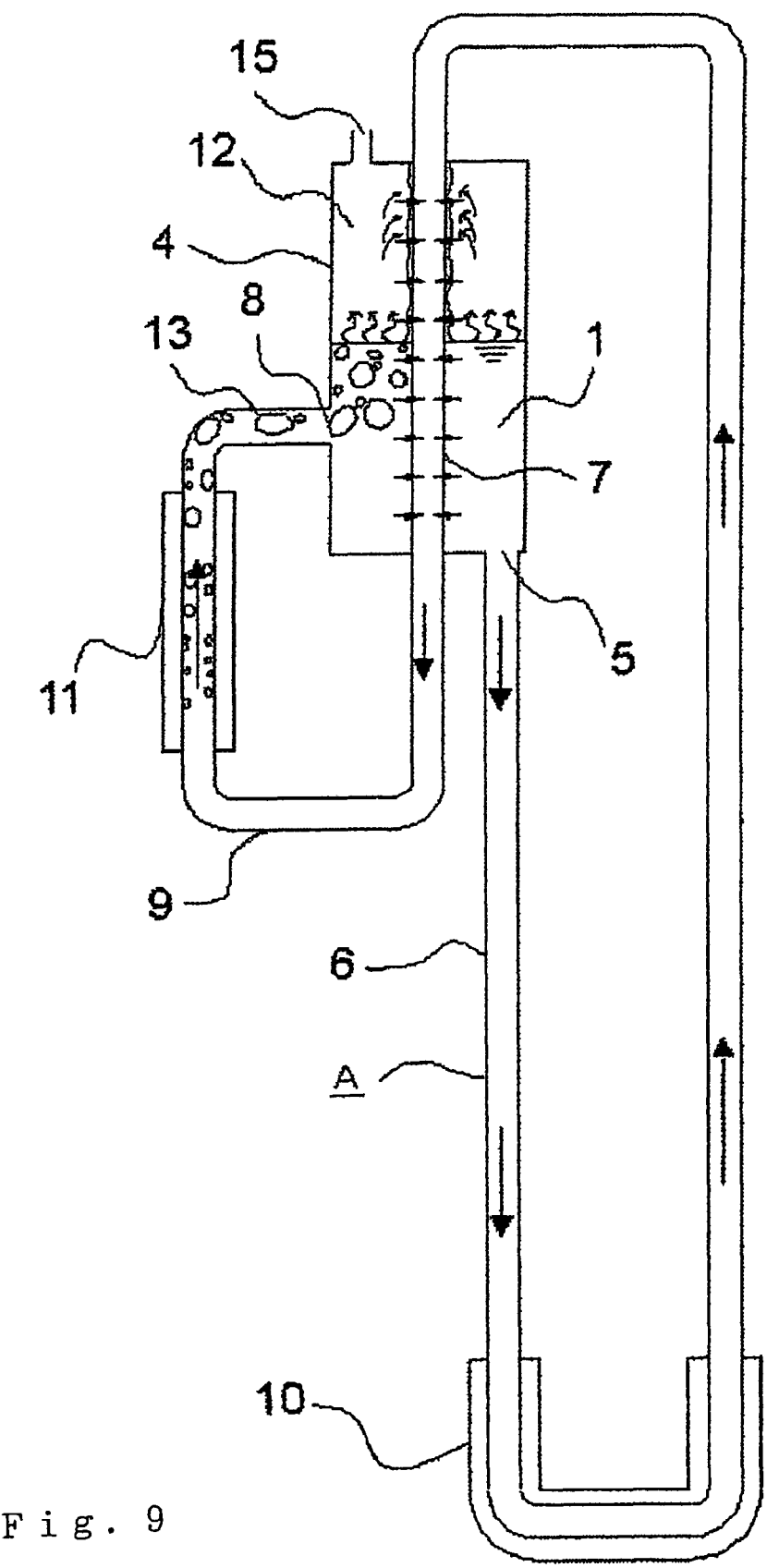
FIG. 9 is a sectional view showing the configuration of an vapor-lift pump type heat transport apparatus according to a fourth embodiment of the invention.

FIG. 9 is a sectional view showing the configuration of an vapor-lift pump type heat transport apparatus according to a fourth embodiment of the invention. As shown in FIG. 9, this apparatus is not such that the internal space of the heat exchange circulating solution container 4 is divided by the partition 3 having the opening 2. Instead, the heat exchange circulating solution container 4 communicates with the environmental space through an opening 15 that is provided at the top of the container 4.

Since the heat exchange circulating solution container 4 communicates with the environmental space, the pressure inside the apparatus is always equal to the environment pressure and does not increase. Since the pressure inside the apparatus does not increase, the saturation temperature inside the apparatus is always equal to the saturation temperature under the environment pressure and increase of the saturation temperature can thus be prevented. In this embodiment, since pressure increase in the container 4 can be prevented, the limitations relating to the withstand pressure design can be relaxed: the walls of the apparatus can be made thinner and hence the apparatus can be reduced in weight and cost. As for the manufacture of the container 4, it is merely required to be free of solution leakage. Not required to be airtight, the container 4 can be manufactured easily. Since the container 4 need not be a vacuum container, the solution confining work becomes easier. However, a proper measure is needed to prevent entrance of dust through the opening 15 and shortage of the solution 1 due to vapor leakage through the opening 15, and regular maintenance is necessary.

In this embodiment, as described above, since the internal space of the container 4 communicates with the environmental space through the opening 15, the pressure inside the apparatus is always constant and almost no variation occurs in the position of the vapor-liquid interface even if the heat load increases. With this configuration, if most of the intra-container pipe 7 were in contact with the heat exchange circulating solution 1 and only a small part of the intra-container pipe 7 were in contact with the vapor 12 in an initial state of heat transfer as in the case of the above embodiments, the heat exchange in the container 4 would become insufficient because almost no variation occurs in the position of the vapor-liquid interface even if the heat load increases. In this embodiment, for example, the intra-container pipe 7 penetrates through the container 4 vertically and a large part of the intra-container pipe 7 is always in contact with the vapor 12 and the heat exchange circulating solution 1. As a result, the heat exchange in the container 4 can be performed sufficiently even with a heavy heat load.

Embodiment 5

Figure 10:
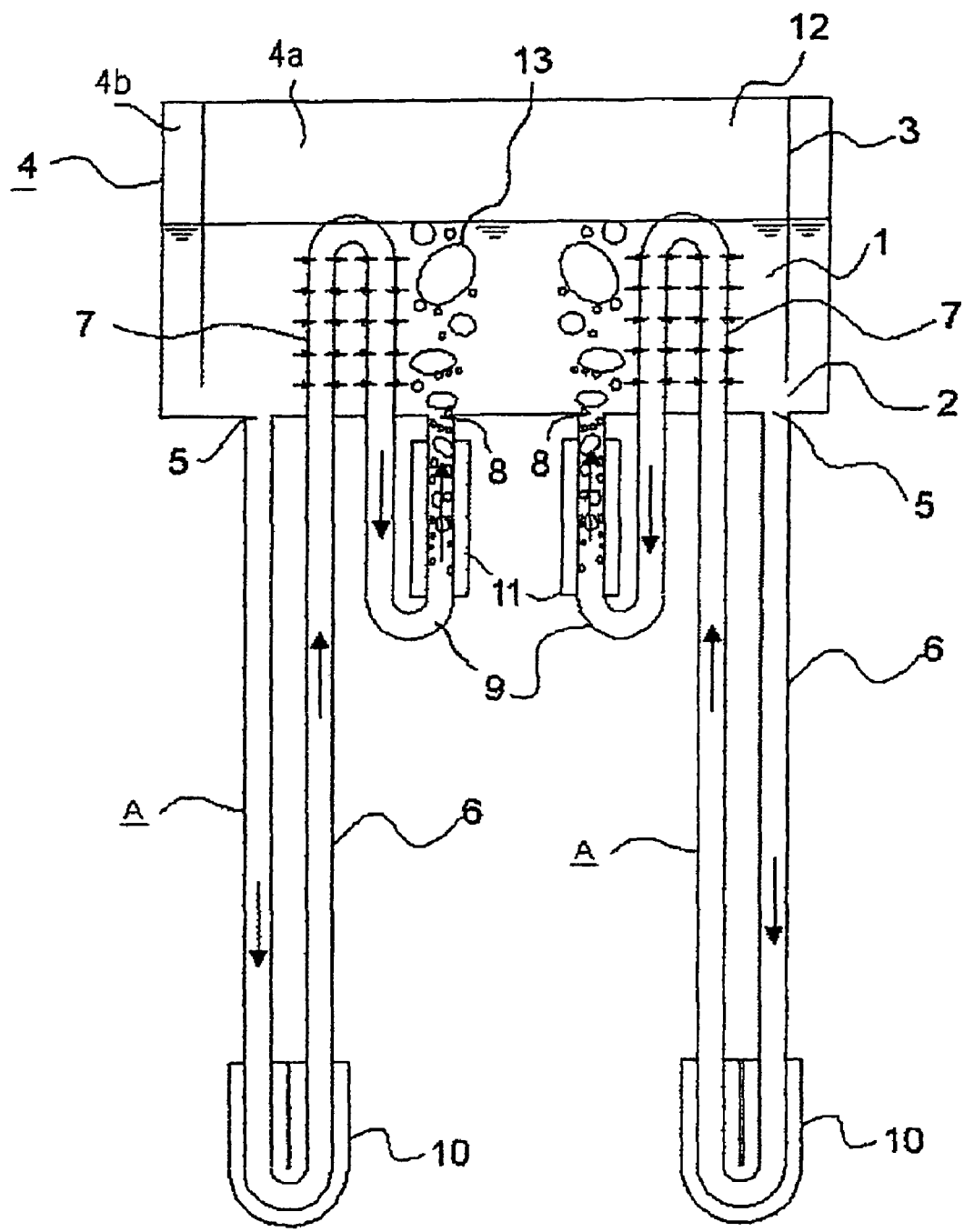
FIG. 10 is a sectional view showing the configuration of an vapor-lift pump type heat transport apparatus according to a fifth embodiment of the invention.

FIG. 10 is a sectional view showing the configuration of an vapor-lift pump type heat transport apparatus according to a fifth embodiment of the invention. In this embodiment, as shown in FIG. 10, two circulating solution transport pipes A are connected to the heat exchange circulating solution container 4. Providing two or more circulating solution transport pipes A increases the heat transmission area and lowers the heat resistance. Further, the heat transport from distributed high-temperature heat sources or to distributed low-temperature heat sources is facilitated. Still further, since the heat exchange circulating solution container 4 is shared by a plurality of circulating solution transport pipes A, the space occupied by the apparatus is smaller than in a case that a plurality of apparatus are installed.

Embodiment 6

Figure 11:
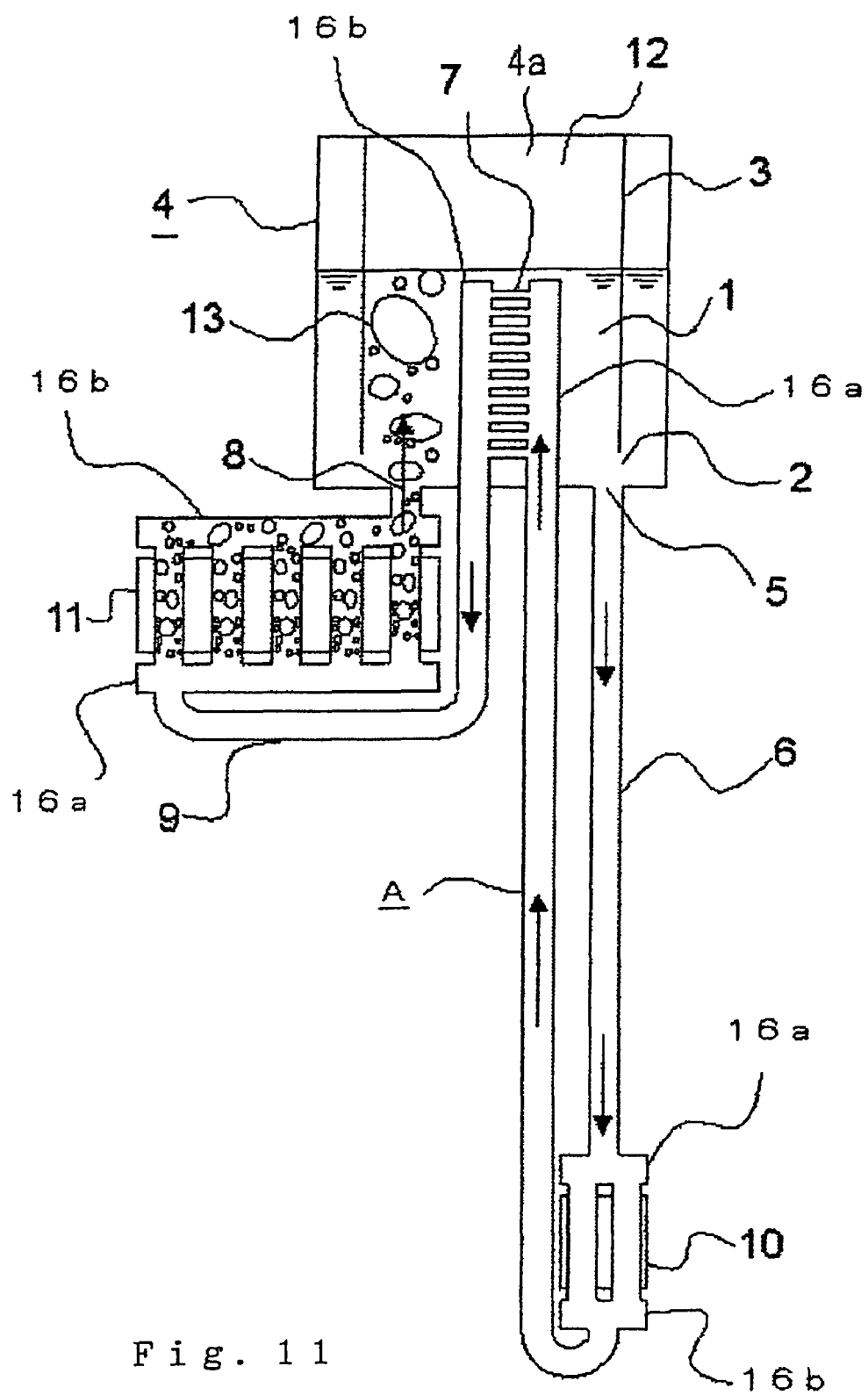
FIG. 11 is a sectional view showing the configuration of an vapor-lift pump type heat transport apparatus according to a sixth embodiment of the invention.

FIG. 11 is a sectional view showing the configuration of an vapor-lift pump type heat transport apparatus according to a sixth embodiment of the invention. In this embodiment, as shown in FIG. 11, the circulating solution transport pipe A is such that each of the portion of the vapor-liquid two-phase fluid inflow pipe 9 to which the heating heat exchanger 11 is attached, the portion of the solution outflow pipe 6 to which the sensible heat releasing heat exchanger 10 is attached, and the intra-container pipe 7 is divided into a plurality of parts by using a distribution container 16*a* and a collection container 16*b*.

This configuration increases the heat transmission area of each portion and reduces the heat resistance and the friction pressure loss. Further, the heat emission or collection to or from a planar, curved, or shapeless fluid is facilitated. Still further, narrow pipes may be used as a plurality of divisional circulating solution transport pipes provided between the distribution container 16*a* and a collection container 16*b*, in which case the heat transmission efficiency is increased and the heat transmission characteristic is further improved.

Embodiment 7

Figure 12:
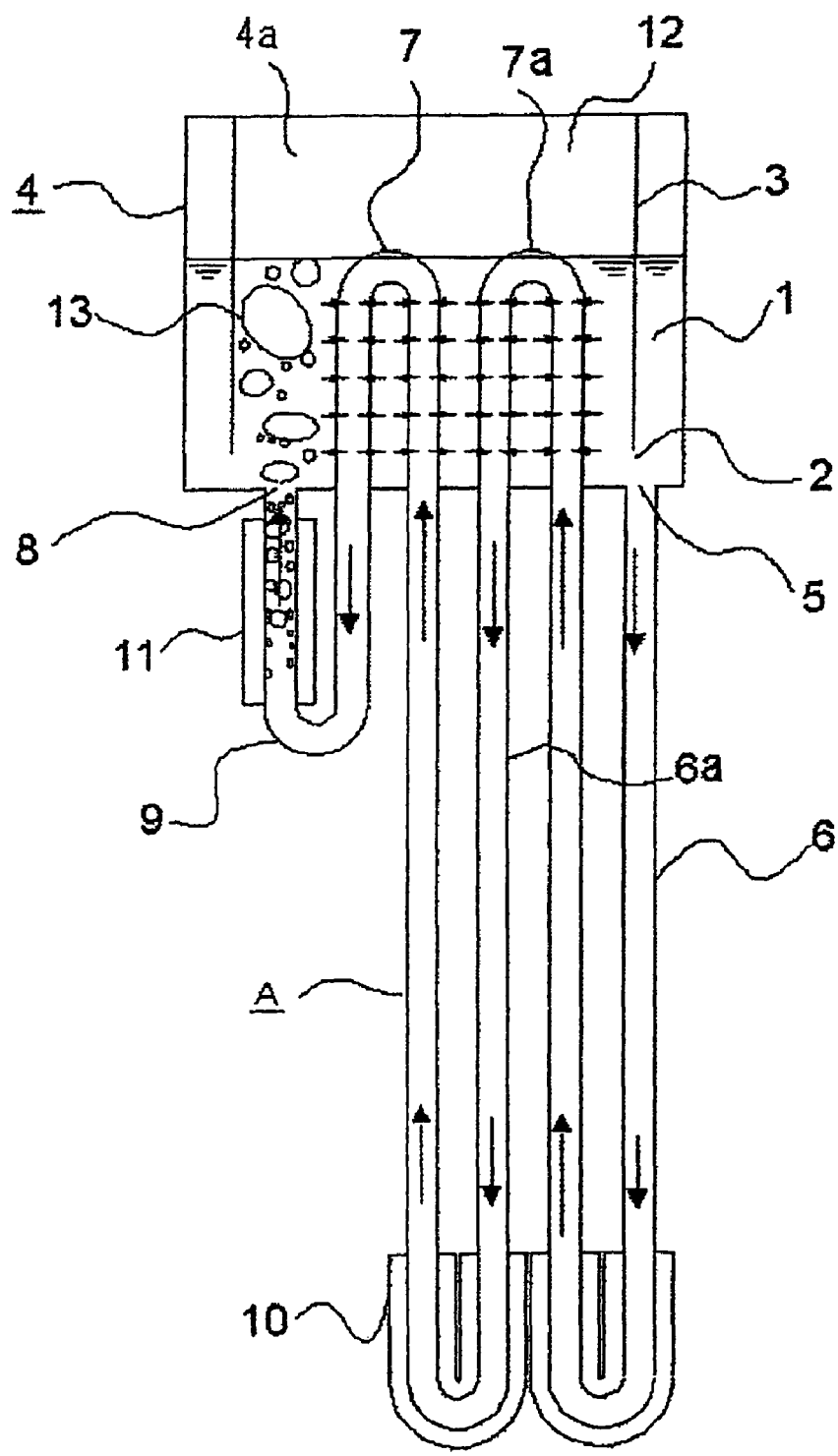
FIG. 12 is a sectional view showing the configuration of an vapor-lift pump type heat transport apparatus according to a seventh embodiment of the invention.

FIG. 12 is a sectional view showing the configuration of an vapor-lift pump type heat transport apparatus according to a seventh embodiment of the invention. In this embodiment, as shown in FIG. 12, the circulating solution transport pipe A consists of one vapor-liquid two-phase fluid inflow pipe 9, one solution outflow pipe 9, two intra-container pipes 7 and 7*a*, and one first extra-container pipe (i.e., fourth transport passage) 6*a* provided between the two intra-container pipes 7 and 7*a*. The extra-container pipe 6*a* is provided with the same sensible heat releasing heat exchanger 10 as the one attached to the solution outflow pipe 6.

This configuration increases the heat transmission area in the container 4 and that of the portions to which the sensible heat releasing heat exchangers 10 are attached and reduces the heat resistance.

The number of parallel flow passages of the circulating solution transport pipe A may further be increased by using two or more first extra-container pipes 6*a* and three or more intra-container pipes 7 and 7*a*, in which case the friction pressure loss that occurs when the heat exchange circulating solution 1 flows through the circulating solution transport pipe A once can be reduced and the circulation flow rate of the circulating solution 1 can thereby be increased (the sensible heat transport capacity is increased). As a result, the total heat resistance is reduced and hence it becomes possible to transport a large amount of heat even if the temperature difference between the heating heat exchanger 11 and the sensible heat releasing heat exchanger 10 is small. Further, the heat emission or collection to or from a planar surface of a solid body, a curved or shapeless fluid, or the like is facilitated.

In this embodiment, different sensible heat releasing heat exchangers 10, 10*a* may be attached to the solution outflow pipe 6 and the extra-container pipe 6*a*.

Figure 13:
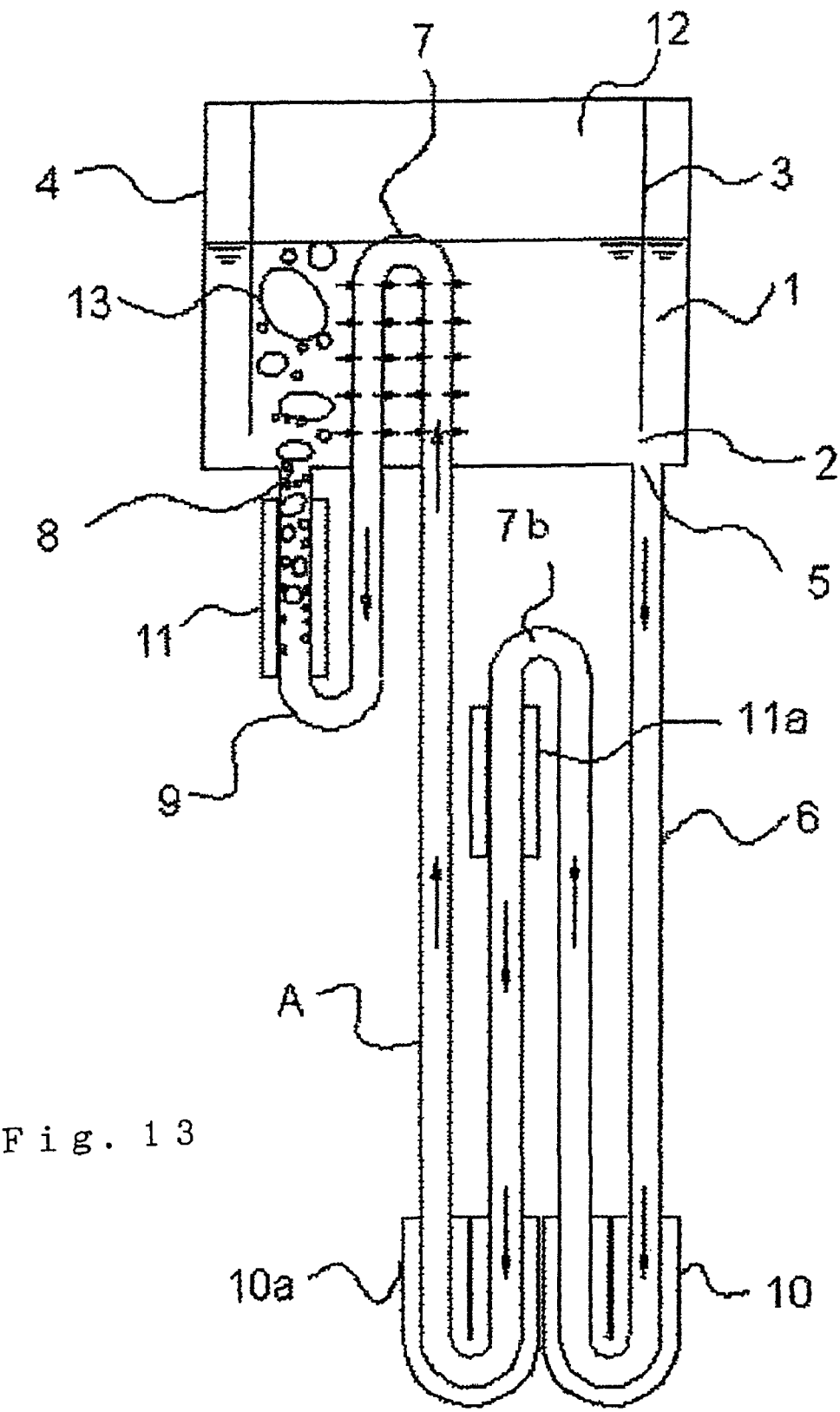
FIG. 13 is a sectional view showing the configuration of another vapor-lift pump type heat transport apparatus according to the seventh embodiment.

In this embodiment, the intra-container pipe 7*a* that is closest to the heating heat exchanger 11 except for the intra-container pipe 7 may be removed from the heat exchange circulating solution container 4 and provided with another heating heat exchanger 11*a*. That is, as shown in FIG. 13, a second extra-container pipe (i.e., fifth transport passage) 7*b* that is provided with the heating heat exchanger 11*a* and a sensible heat releasing heat exchanger 10*b* may be provided between the solution outflow pipe (first transport passage) 6 and the intra-container pipe (second transport passage) 7. A plurality of second extra-container pipes (fifth transport passages) 7*b* may be provided.

This configuration makes it possible to collect and transport heat from distributed heat sources with the single heat exchange circulating solution container 4. And the apparatus is made compact.

Further, by controlling the heating heat exchanger 11 (e.g., a heater is provided as the heating heat exchanger 11 and the electric power supplied to the heater is adjusted), the circulation flow rate of the heat exchange circulating solution 1 can be adjusted and the temperature of the other heating heat exchanger 11*a* can be adjusted while heat is transported from it.

Embodiment 8

Figure 14:
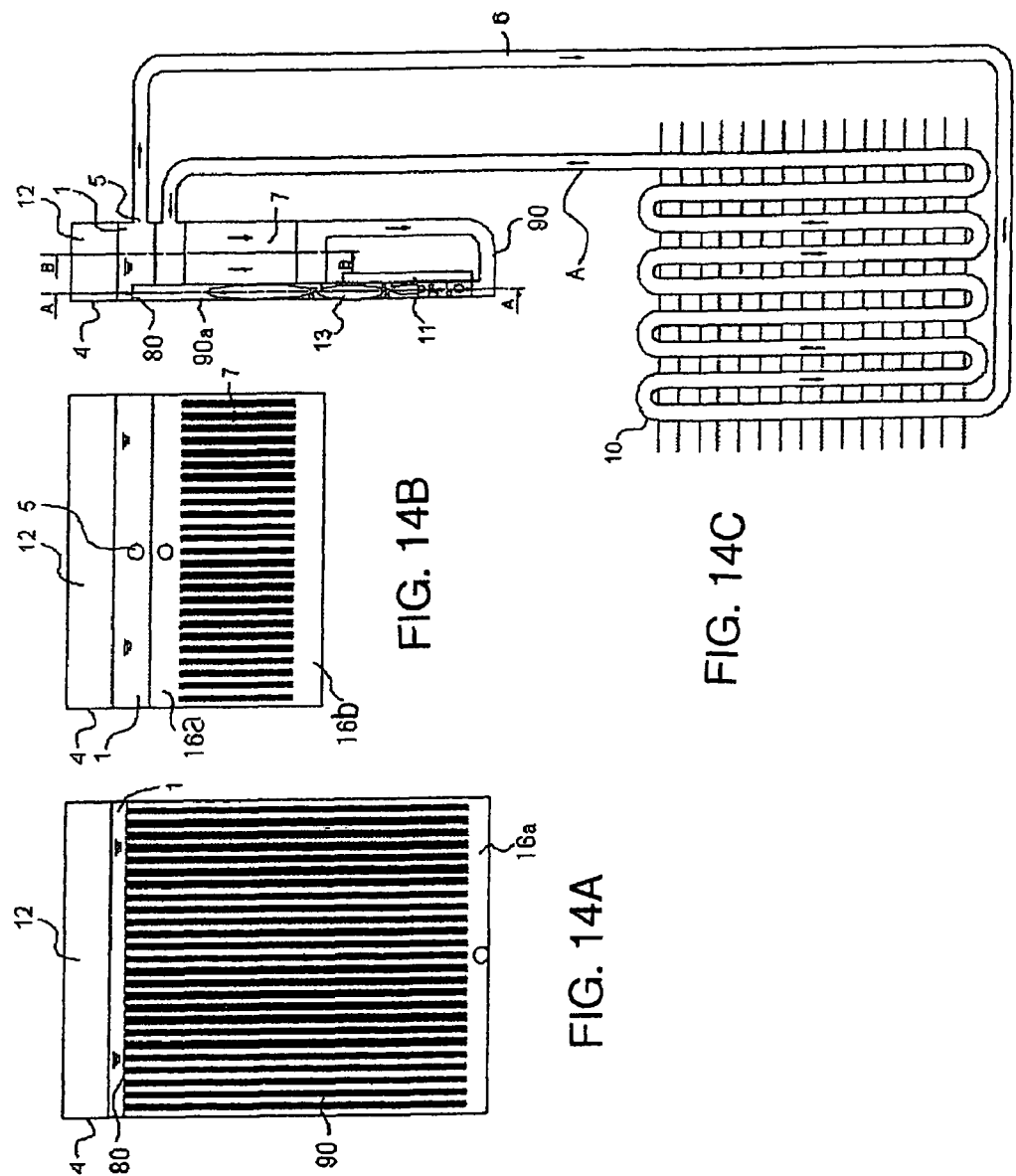
FIGS. 14A-14C are sectional views showing the configuration of an vapor-lift pump type heat transport apparatus according to an eighth embodiment of the invention.

FIGS. 14A-14C are sectional views showing the configuration of an vapor-lift pump type heat transport apparatus according to an eighth embodiment of the invention. FIGS. 14A and 14B are sectional views taken along lines A-A and B-B in FIG. 14C, respectively.

In this embodiment, a heat exchange circulating solution container 4 contains a heat exchange circulating solution 1 whose temperature is increased to a high temperature and vapor 12. The heat exchange circulating solution container 4 is provided with a solution outlet 5 through which to send out a heat exchange-circulating solution 1 from the container 4 and a solution inlet 80 through which to introduce a heat exchange circulating solution 1 into the container 4. A circulating solution transport pipe A is connected to the solution inlet 80 and the solution outlet 5 of the container 4 to form a circulating solution transport passage through which the heat exchange circulating solution 1 circulates.

The circulating solution transport pipe A includes a solution outflow pipe (first transport passage) 6 that is connected to the solution outlet 5, an intra-container pipe (second transport passage) 7 that goes through the heat exchange circulating solution container 4 and allows the heat exchange circulating solution 1 in the pipe 7 to exchange heat with the heat exchange circulating solution 1 in the container 4, and a solution inflow pipe (third transport passage) 90 that is connected to the solution inlet 80. A heat exchange circulating solution 1 goes out of the heat exchange circulating solution container 4, goes through the solution outflow pipe 6, the intra-container pipe 7, and the solution inflow pipe 90, and returns to the container 4. The solution outflow pipe 6 of the circulating solution transport pipe A is provided with a sensible heat releasing heat exchanger 10. The solution inflow pipe 90 is provided with a heating heat exchanger 11.

The solution inflow pipe 90 which is provided with the heating heat exchanger 11 projects into the container 4 and the solution inlet 80 is located under the vapor-liquid interface in the container 4. A projected pipe portion 90a that is located between the solution inlet 80 and the heating heat exchanger 11 in the container 4 is in contact with the intra-container pipe 7, whereby the heat exchange circulating solution 1 in the intra-container pipe 7 exchanges heat with the heat exchange circulating solution 1 in the pipe 90a and vapor bubbles 13 in the pipe 90a produced from the heat exchange circulating solution 1.

Vapor bubbles 13 may enter the heat exchange circulating solution container 4 through the solution inlet 80. Those vapor bubbles 13 condense because the heat exchange circulating solution 1 or vapor bubbles 13 in the container 4 contact the intra-container pipe 7 and exchange heat there. Since the amount of vapor bubbles 13 in the solution inflow pipe 90 varies, it is necessary that the solution 1 be confined so that a space for accommodating vapor 12 is formed in the container 4.

As shown in FIGS. 14A-14C, the portion of the solution inflow pipe 90 between the heating heat exchanger 11 and the solution inlet 80 is divided into a plurality of parts using a distribution container 16a. As in the case of the sixth embodiment, the intra-container pipe 7 is divided into a plurality of parts using a distribution container 16a and a collection container 16b.

The heat exchange circulating solution container 4 is not divided by a partition 3 and hence has only a first space.

In this embodiment, the heat exchange circulating solution 1 in the solution inflow pipe 90 is boiled by means of the heating heat exchanger 11. Resulting vapor bubbles 13 condense in the pipe portion 90a which is in contact with the intra-container pipe 7 and a resulting heat exchange circulating solution 1 is introduced into the container 4 through the solution inlet 80. As the heat load increases, the amount of vapor in the pipe portion 90a increases and hence the area of the portion where condensation occurs and the force for stirring the solution 1 increase, whereby the heat exchange comes to be performed more efficiently. Therefore, in this embodiment, the heat transmission characteristic of the pipe portion 90a varies with a variation of the amount of vapor therein, whereby pressure increase in the apparatus can be suppressed automatically. As a result, the heat resistance is reduced and the heat transport capability is increased. That is, as in the case of the first embodiment, the heat exchange characteristic in the heat exchange circulating solution container 4 is enhanced as the heat load increases.

In the heat transport apparatus according to this embodiment, as in the first embodiment, the heat exchange circulating solution 1 is circulated continuously through the apparatus by utilizing the density difference occurring in the solution 1 without using external motive power. Therefore, a large amount of heat can be transported in every direction. Long-distance transport is also enabled. Since no pump or the like having a movable portion is used, the apparatus is highly durable and reliable, compact, and light.

Further, since the heat transmission characteristic of the pipe portion 90a varies with a variation of the amount of vapor therein and pressure increase in the apparatus is thereby suppressed automatically, the heat resistance is small and the heat transport capacity is increased.

A large amount of heat can be transported even in the case where the temperature difference between the heating heat exchanger 11 and the sensible heat releasing heat exchanger 10 is small.

Since the intra-container pipe 7 is provided under the vapor-liquid interface in the heat exchange circulating solution container 4, a ripple that would otherwise occur in the circulation flow rate in a light heat load condition does not occur and heat can be transported stably in a wide load range from a light heat load to a heavy heat load.

If heat is transmitted directly from the heating heat exchanger 11 to the intra-container pipe (second transport passage) 7, the amount of vapor generated decreases to lower the circulation flow rate of the heat exchange circulating solution 1. Therefore, it is preferable to provide a heat insulation groove between the heating heat exchanger 11 and the intra-container pipe 7.

Embodiment 9

Figure 15:
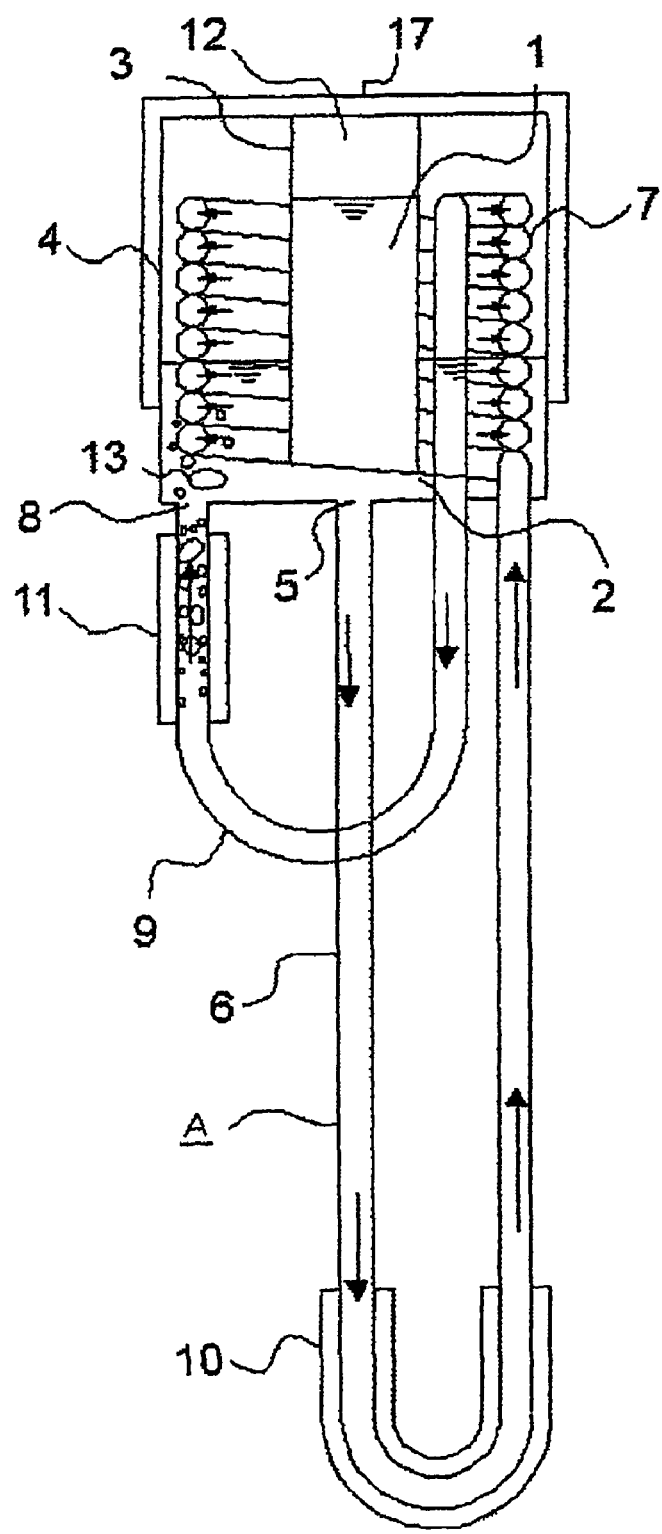
FIG. 15 is a sectional view showing the configuration of an vapor-lift pump type heat transport apparatus according to a ninth embodiment of the invention.

FIG. 15 is a sectional view showing the configuration of an vapor-lift pump type heat transport apparatus according to a ninth embodiment of the invention. In this embodiment, as shown in FIG. 15, an emission heat exchanger 17 is provided around the heat exchange circulating solution container 4.

With this measure, the heat that is input from the heating heat exchanger 11 can be transported to both the emission heat exchanger 17 and the sensible heat releasing heat exchanger 10, whereby the heat emission capability is increased.

The emission heat exchanger 17 is a heat receiving portion of another heat transport apparatus. Heat emission may be attained by exposing the outer wall surface of the heat exchange circulating solution container 4 directly to an environment fluid and utilizing water cooling, natural air cooling, forced air cooling (including use of a wind received during running), or radiation. Fins may be attached to the outer wall surface.

The above configuration is mainly intended for heat emission. The outer wall surface may be heat-insulated when it is necessary to reduce the heat emission rate. For example, an operation is possible in which for a certain period the outer wall surface is exposed to increase the heat emission rate and for an another period the outer wall surface is surrounded by a heat insulation cover to transport heat to the sensible heat releasing heat exchanger 10.

If the sensible heat releasing heat exchanger 10 is used as a heating device and the heat emission heat exchanger 17 as a heat emission device, heat can be transported upward. Heat can thus be transported in both directions.

Embodiment 10

Figure 16:
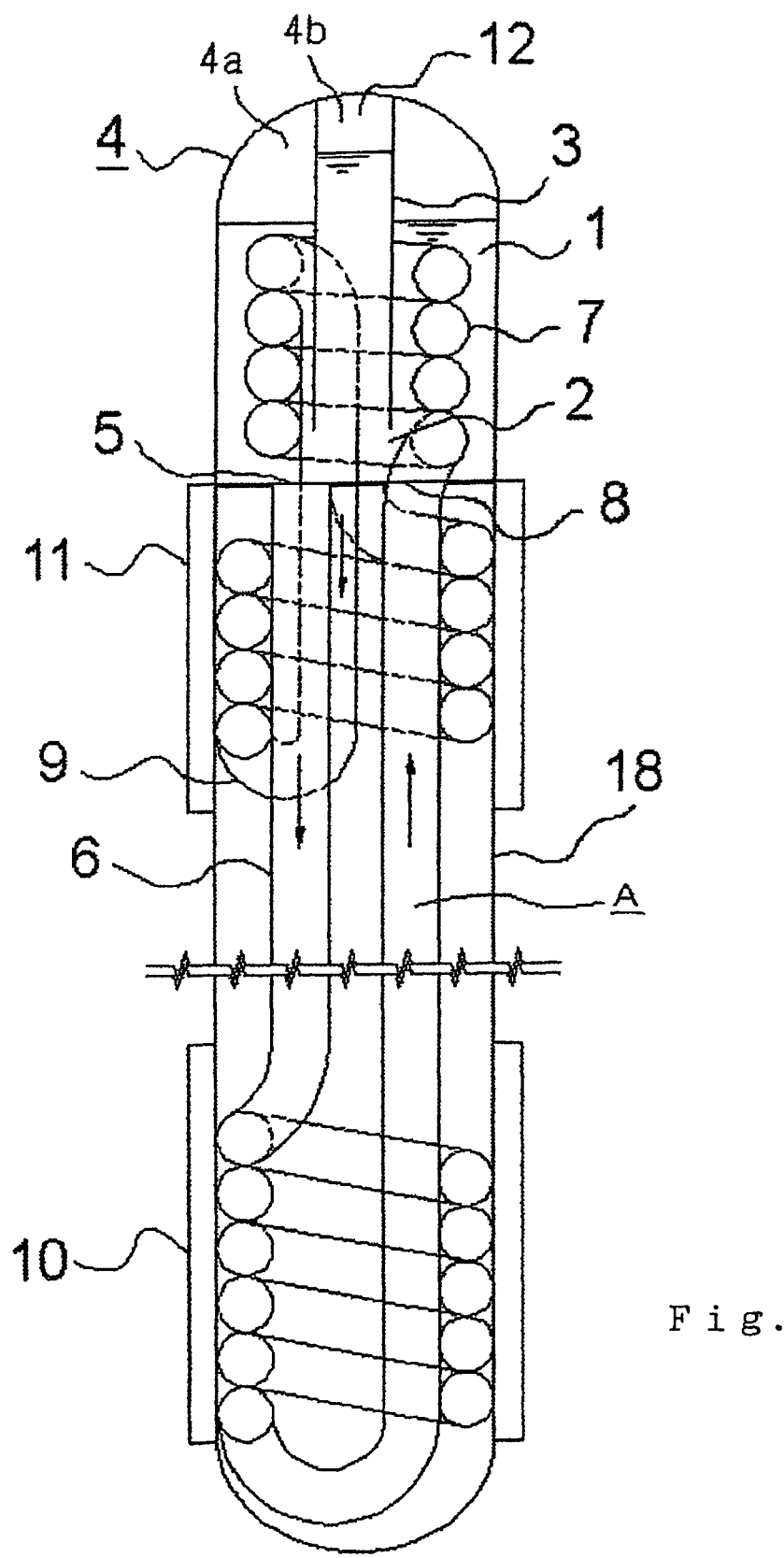
FIG. 16 is a sectional view showing the configuration of an vapor-lift pump type heat transport apparatus according to a 10th embodiment of the invention.

FIG. 16 is a sectional view showing the configuration of an vapor-lift pump type heat transport apparatus according to a 10th embodiment of the invention. In this embodiment, as shown in FIG. 16, the main body of a heat transport apparatus according to the invention is incorporated in a loop container 18. More specifically, the heat exchange circulating solution container 4 consisting of the first space 4a and the second space 4b is housed in the loop container 18 and the heating heat exchanger 11 and the sensible heat releasing heat exchanger 10 are in contact with the loop container 18. The intra-container pipe 7, the vapor-liquid two-phase fluid inflow pipe 9, and the solution outflow pipe 6 that constitute the circulating solution transport pipe A are housed in the loop container 18 so as to be provided spirally in the first space 4a, the portion to which the heating heat exchanger 11 is attached, and the portion to which the sensible heat releasing heat exchanger 10 is attached, respectively. This configuration allows the heat transport apparatus to be buried in soil, a wall of a building, or the like.

Figure 17:
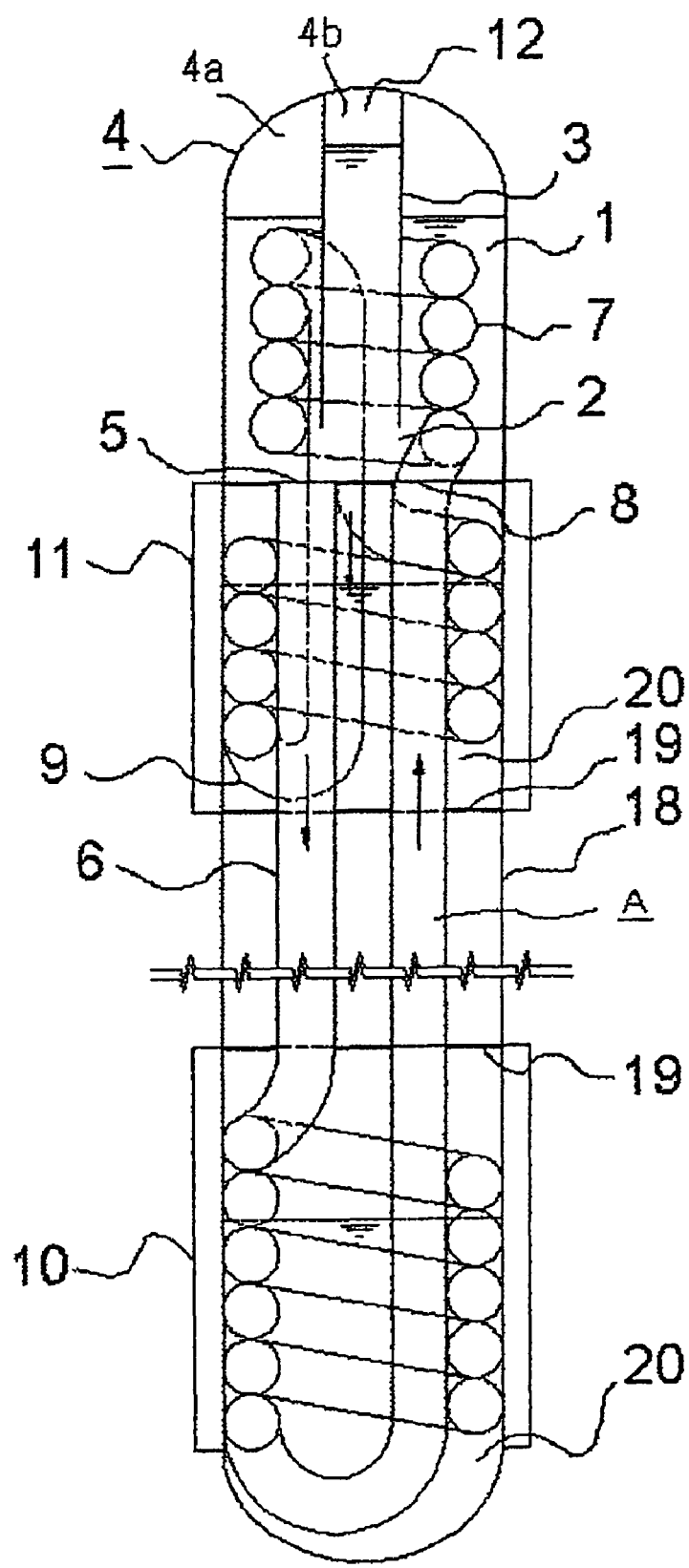
FIG. 17 is a sectional view showing the configuration of another vapor-lift pump type heat transport apparatus according to the 10th embodiment.

FIG. 17 is a sectional view showing the configuration of another vapor-lift pump type heat transport apparatus according to the 10th embodiment. In the vapor-lift pump type heat transport apparatus shown in FIG. 17, a partition plate 19 is provided in each of the portion of the loop container 18 that is in contact with the heating heat exchanger 11 and the portion of the loop container 18 that is in contact with the sensible heat releasing heat exchanger 10 and a proper amount of heat exchange solution 20 is confined in each space thus formed.

This configuration makes it possible to lower the contact heat resistance between the circulating solution transport pipe A and the loop container 18 and to thereby improve the heat transport characteristic.

The loop container 18 has a role of exchanging heat with soil, an environment fluid, a heat receiving portion, or a heat emission portion. Fins may be attached to the inner and outer wall surfaces of the loop container 18. In particular, spiral fins may be provided around the wall of the portion of the loop container 18 to which the sensible heat releasing heat exchanger 10 is attached, in which case the burying of the heat transport apparatus in soil is further facilitated.

Figure 18:
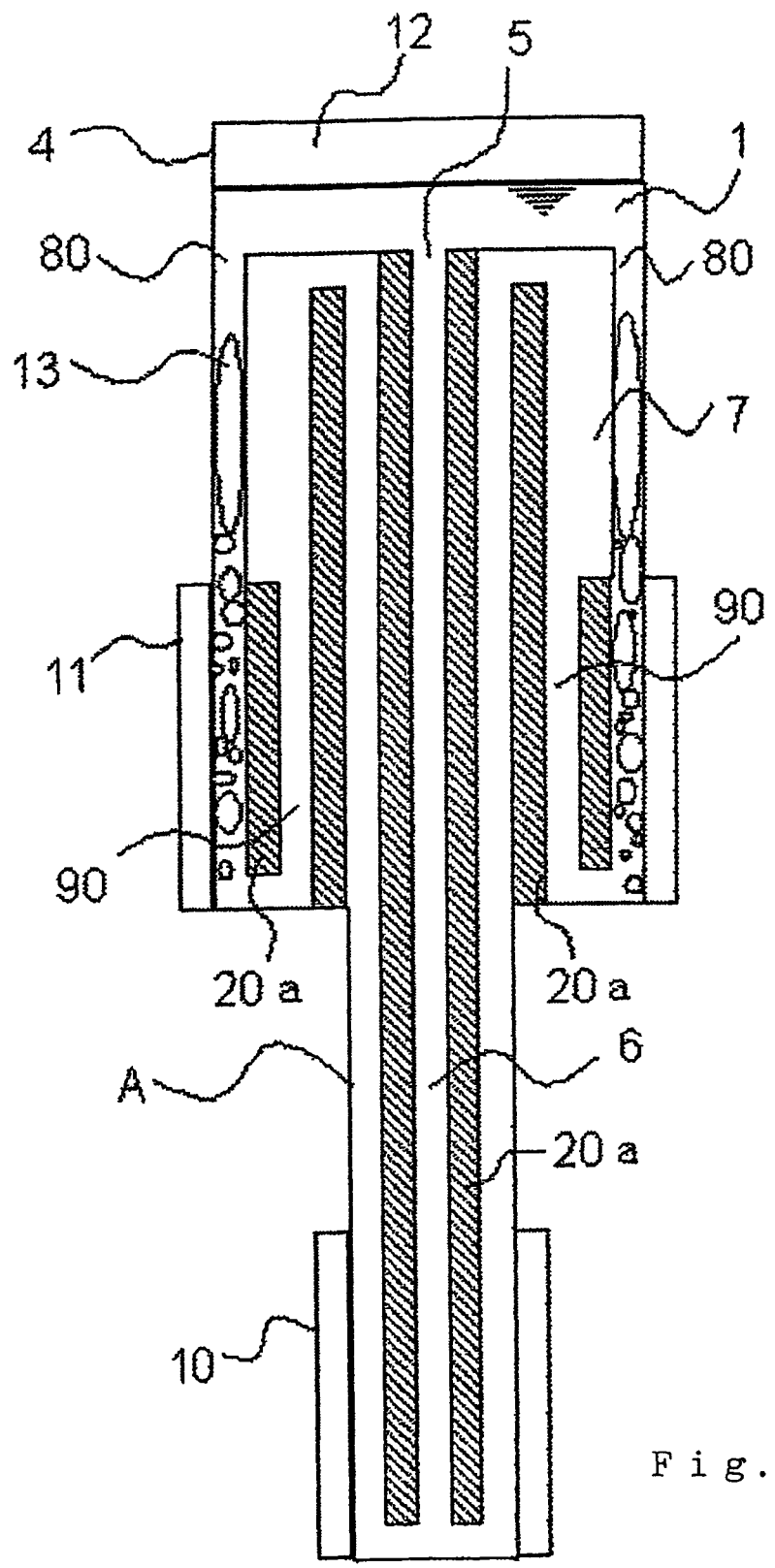
FIG. 18 is a sectional view showing the configuration of a further vapor-lift pump type heat transport apparatus according to the 10th embodiment.

FIG. 18 is a sectional view showing the configuration of a further vapor-lift pump type heat transport apparatus according to the 10th embodiment. The vapor-lift pump type heat transport apparatus shown in FIG. 18 is a quadruple-pipe-structure version of the vapor-lift pump type heat transport apparatus according to the eighth embodiment. In this case, as shown in FIG. 18, it is preferable that heat insulating members (including air insulation and vacuum insulation) 20a be provided for unnecessary heat exchange portions to lower the degree of heat exchange there.

This configuration makes it possible to manufacture the apparatus more easily and to reduce the cost.

Embodiment 11

Figure 19:
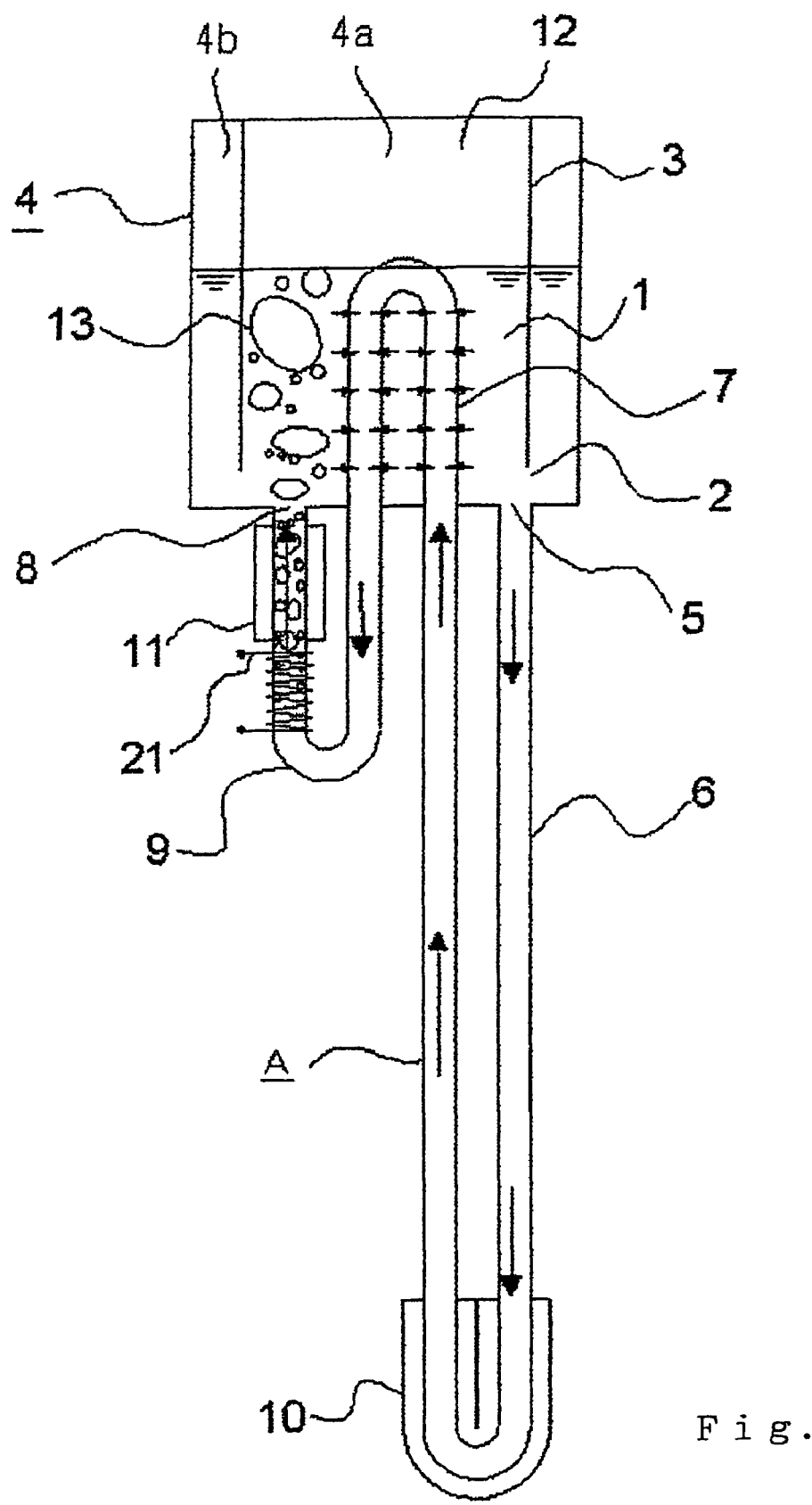
FIG. 19 is a sectional view showing the configuration of an vapor-lift pump type heat transport apparatus according to an 11th embodiment of the invention.

FIG. 19 is a sectional view showing the configuration of an vapor-lift pump type heat transport apparatus according to an 11th embodiment of the invention. In this embodiment, as shown in FIG. 19, an auxiliary heater 21 is attached to the vapor-liquid two-phase fluid inflow pipe 9 at a halfway position.

With this measure, even when the temperature difference between the heating heat exchanger 10 and the sensible heat releasing heat exchanger 11 is small and the heat exchange circulating solution 1 in the heating heat exchanger 10 does not boil, the heat exchange circulating solution 1 can be boiled by heating it by energizing the auxiliary heater 21 and is allowed to flow through the circulating solution transport pipe A. Heat can be transported even when the temperature difference is small.

The auxiliary heater 21 may be disposed below the heating heat exchanger 10 (see FIG. 19) or above the heating heat exchanger 10 as long as it can cause elevation of the solution 1 in the vapor-liquid two-phase fluid inflow pipe 9.

Figure 20A:
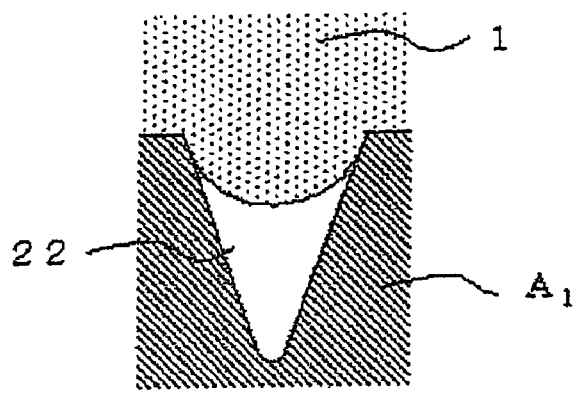
FIGS. 20A and 20B show a gas bubble nucleus according to the 11th embodiment.
Figure 20B:
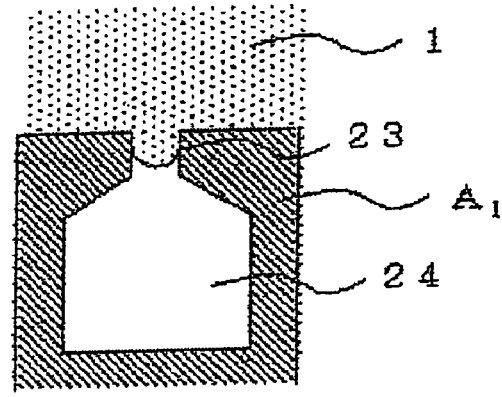
Figure 21:
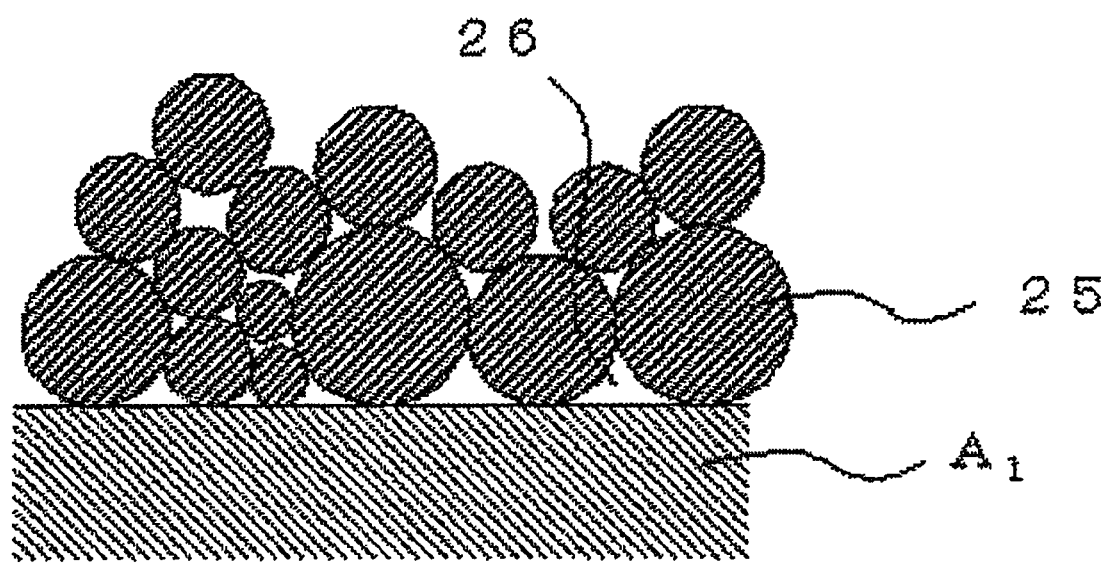
FIG. 21 shows another a gas bubble nucleus according to the 11th embodiment.

The inner surface of the portion of the pipe 9 to which the auxiliary heater 21 or the heating heat exchanger 11 is attached may be provided with gas bubble nuclei. The gas bubble nuclei have a role of maintaining presence of gas on the above inner surface or a nearby fluid passage in a stable manner irrespective of a flow or stirring of a fluid, a temperature variation of a fluid or the passage wall, and other factors. The gas bubble nuclei may be scratches 22 formed on a pipe inner surface $A_1$ (see FIG. 20A) or spaces (reentrant cavities) 24 each of which communicates with the flow passage of the fluid (heat exchange circulating solution 1) via a conduit 23 (see FIG. 20B). The recesses shown in FIGS. 20A and 20B may be formed by mechanical or chemical processing. Alternatively, a wire net may be spread on the inner surface. As a further alternative, as shown in FIG. 21, metal particles 25 may be sintered on or joined to the pipe inner surface $A_1$ to form gas bubble nuclei 26.

With this structure, even when the temperature is low and the internal pressure is low, the residual gas in the gas bubble nuclei serve as sources of generation of vapor bubbles 13, whereby vapor bubbles 13 can be generated easily. Heat transport is started easily and the heat characteristic is improved. Further, a boil occurs easily even when the temperature difference between the fluid in the pipe 9 and the inner surface of the portion of the pipe 9 to which the heating heat exchanger 11 is attached is small. The heat characteristic is thus improved.

Embodiment 12

Figure 22:
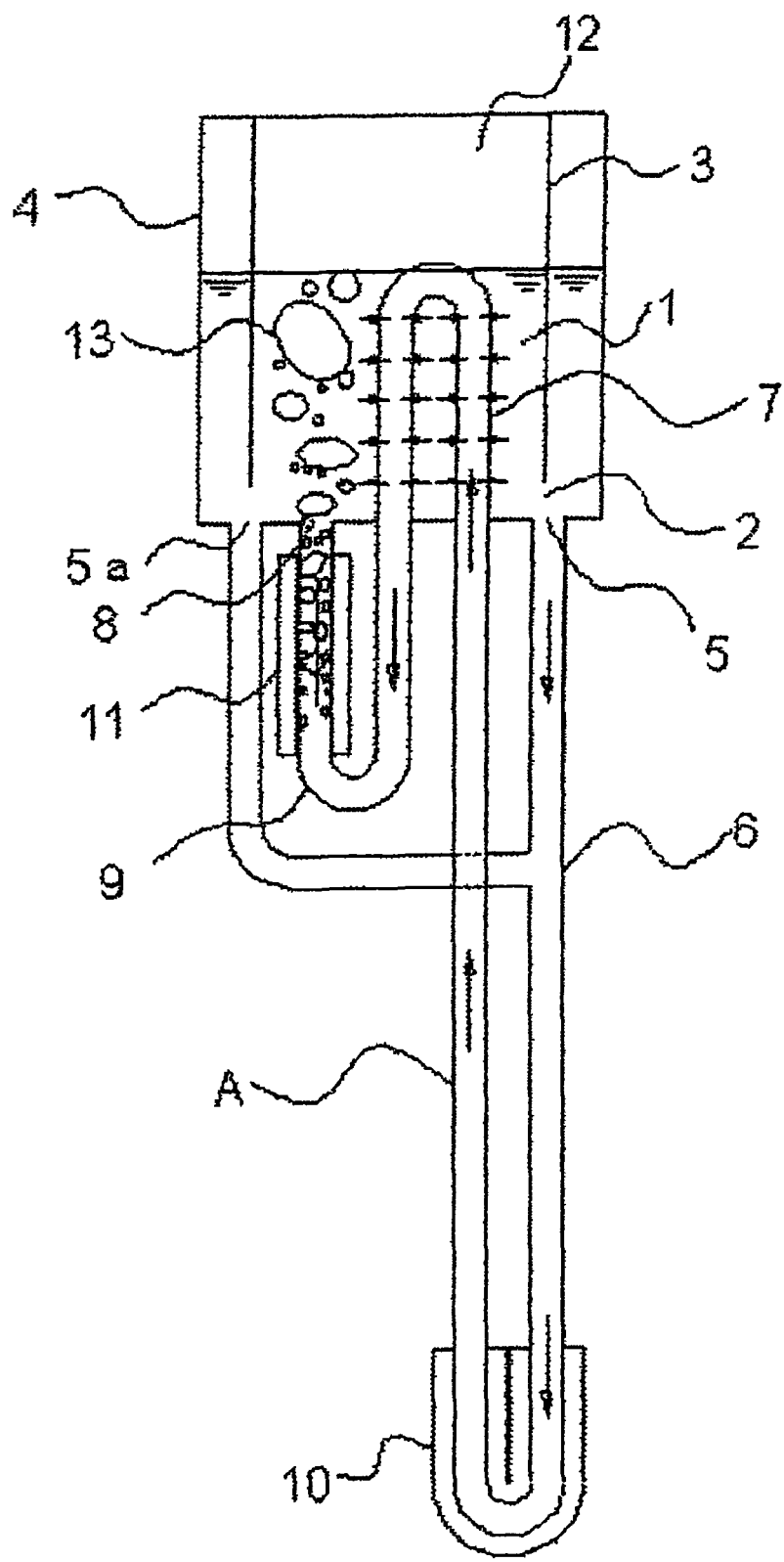
FIG. 22 is a sectional view showing the configuration of an vapor-lift pump type heat transport apparatus according to a 12th embodiment of the invention.

FIG. 22 is a sectional view showing the configuration of an vapor-lift pump type heat transport apparatus according to a 12th embodiment of the invention. In this embodiment, as shown in FIG. 22, the heat exchange circulating solution container 4 is provided with solution outlets 5 and 5a at right and left ends. Branches of the solution outflow pipe 6 are connected to the respective solution outlets 5 and 5a and the trunk solution outflow pipe 6 is connected to the intra-container pipe 7.

When the vapor-lift pump type heat transport apparatus is mounted on a vehicle, the vapor-liquid interface of the heat exchange circulating solution 1 in the heat exchange circulating solution container 4 moves due to inclination of the apparatus and gravity to possibly cause an event that the solution outlet 5 is exposed to the vapor space. At the occurrence of such an event, vapor is introduced into the solution outflow pipe 6, as a result of which the circulation of the heat exchange circulating solution 1 is impaired and the heat transport characteristic becomes worse. In contrast, in this embodiment in which the heat exchange circulating solution container 4 is provided with a plurality of solution outlets 5 and 5a, the branches of the solution outflow pipe 6 are connected to those solution outlets 5 and 5a, and the trunk solution outflow pipe 6 is connected to the intra-container pipe 7, the apparatus is less prone to the influences of its right-left or front-rear inclination and the direction of body force (e.g., gravity).

Figures 23A, 23B:
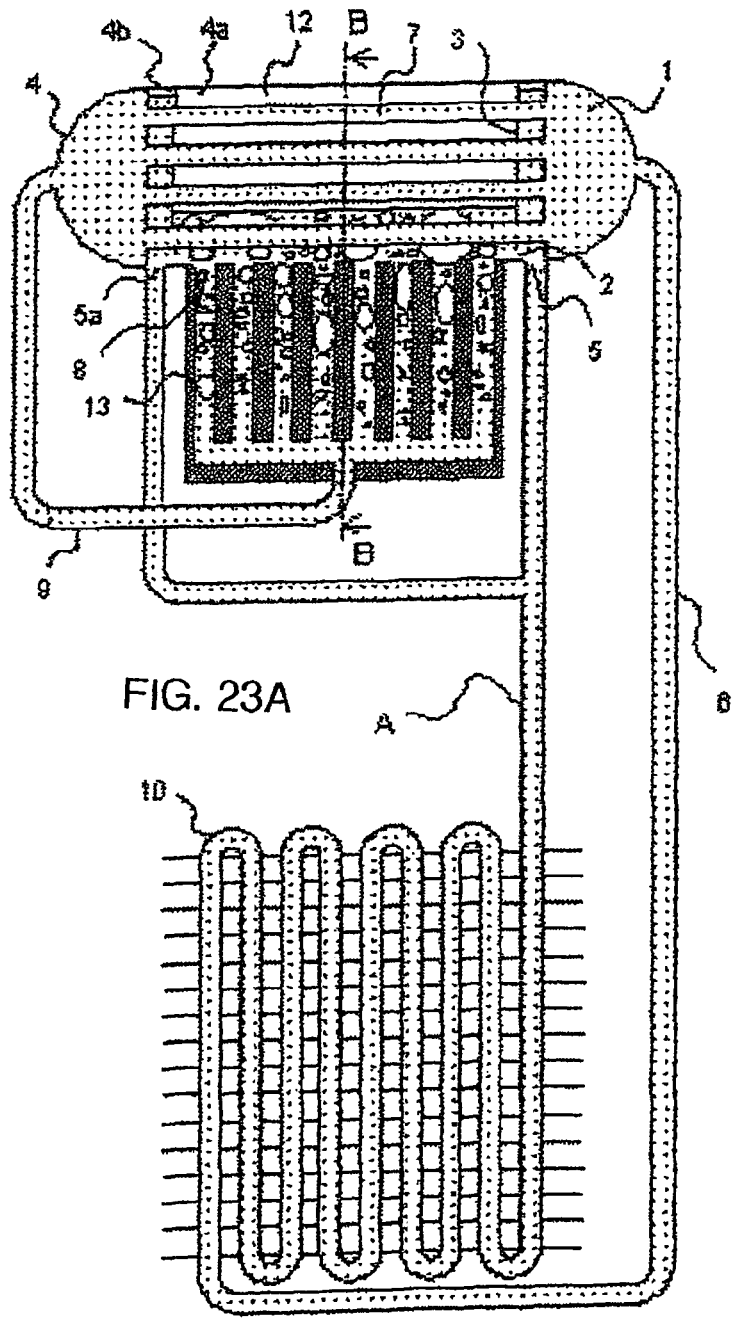
FIGS. 23A and 23B are sectional views showing the configuration of another vapor-lift pump type heat transport apparatus according to the 12th embodiment.

FIGS. 23A and 23B are sectional views showing the configuration of another vapor-lift pump type heat transport apparatus according to the 12th embodiment. FIG. 23B is a sectional view taken along line B-B in FIG. 23A. As shown in FIGS. 23A and 23B, the heat exchange circulating solution container 4 is oriented horizontally and is provided with solution outlets 5 and 5a at the right and left ends. Branches of the solution outflow pipe 6 are connected to the respective solution outlets 5 and 5a and the trunk solution outflow pipe 6 is connected to the intra-container pipe 7.

In this embodiment, the portion of the vapor-liquid two-phase fluid inflow pipe 9 to which the heating heat exchanger 11 is attached is a circulating solution transport pipe that is divided into a plurality of parts by using a distribution container 16a. The intra-container pipe 7 is a circulating solution transport pipe that is divided into a plurality of parts by using a distribution container 16a and a collection container 16b.

This configuration provides the same advantages as the configuration of FIG. 22 does.

Embodiment 13

Figure 24:
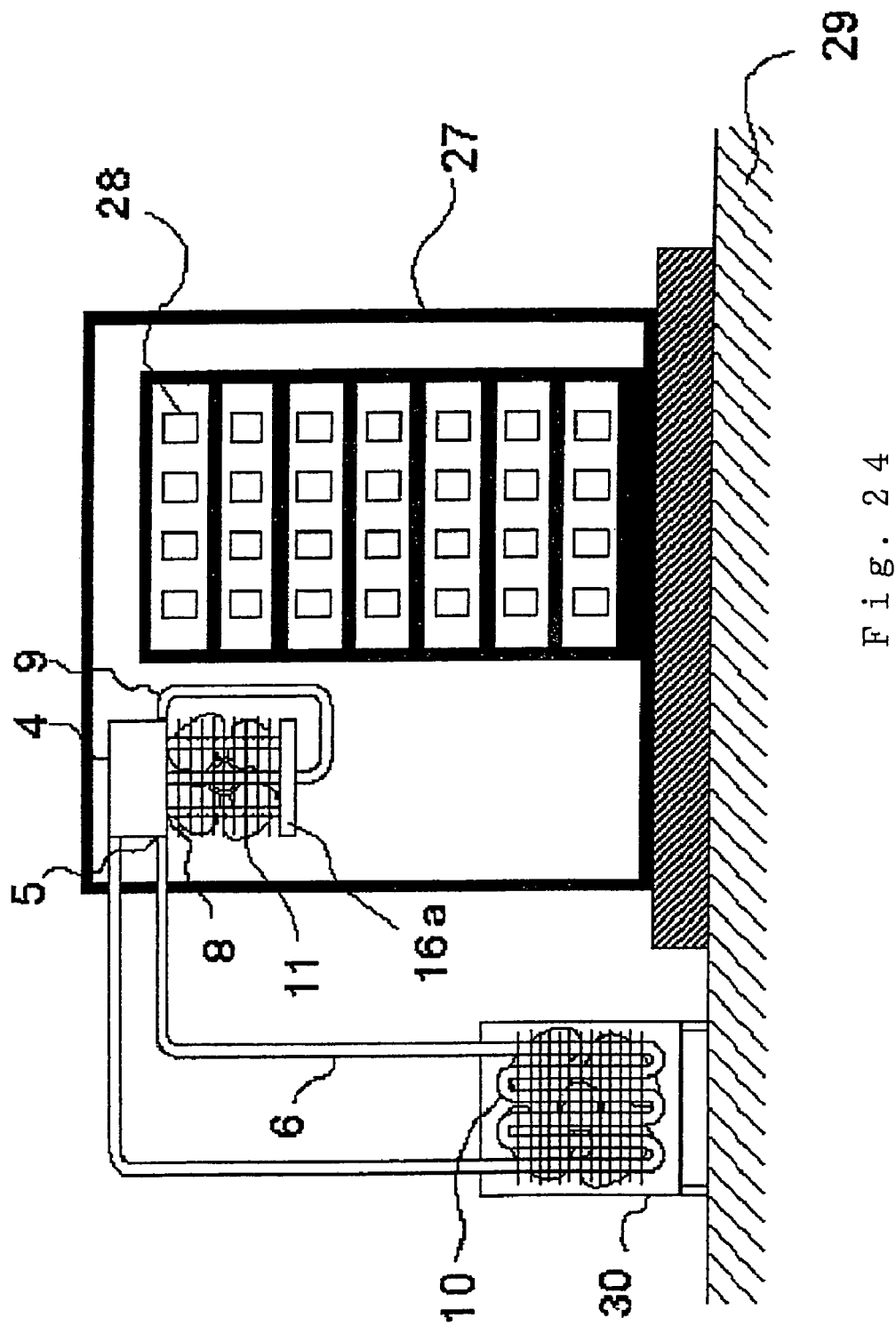
FIG. 24 shows the configuration of an air-conditioning system for a case according to a 13th embodiment of the invention.

FIGS. 24-17 show specific configurations of air-conditioning systems or air-conditioning assisting systems for a case or a building that employ an vapor-lift pump type heat transport apparatus according to the invention.

Figure 25:
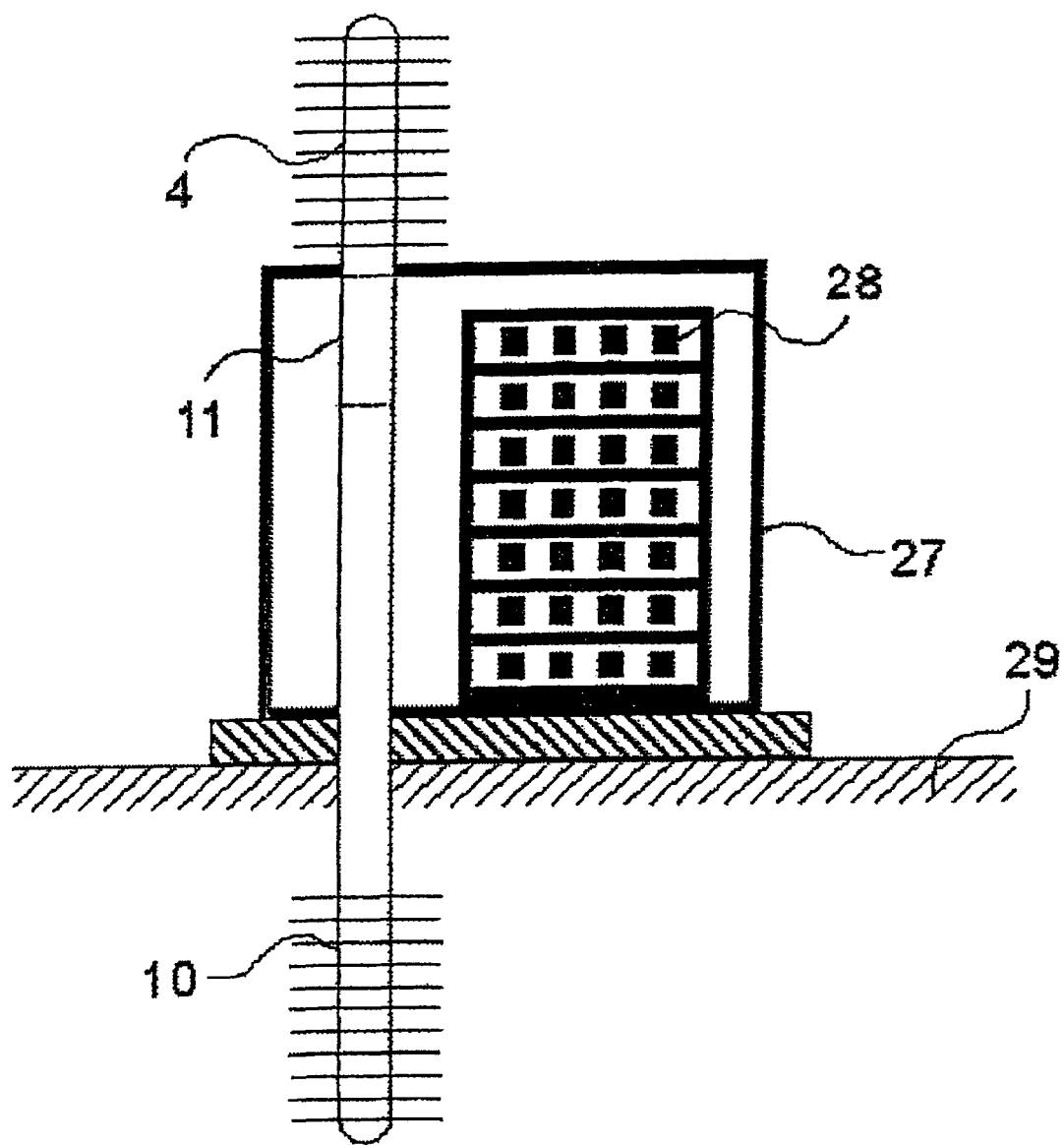
FIG. 25 shows the configuration of another air-conditioning system for a case according to the 13th embodiment.

As shown in FIGS. 24 and 25, the heating heat exchanger 11 is provided in a case 27 that protects heating bodies such as control apparatus and the sensible heat releasing heat exchanger 10 is provided in the environment air (as part of an outdoor apparatus 30) or in the ground (soil, sewage, or a heat accumulator (for later use of heat)) 29.

With the above configurations, heat can be transported with no load. The temperature variation in the case or the building can be reduced. Therefore, the energy can be saved by using the above systems as a replacement of an air-conditioning apparatus so far used or an assisting system of an air-conditioning apparatus so far used.

The installation location of the heating heat exchanger 11 is not limited to the inside of the apparatus 27; the heating heat exchanger 11 may be attached directly to heating bodies or installed in a case or on the roof, the rooftop, the attic, or a side wall of a building on which sunlight directly shines. The installation location of the sensible heat releasing heat exchanger 10 is not limited, either; it may be installed in a river, the sea, or the like.

Figure 26:
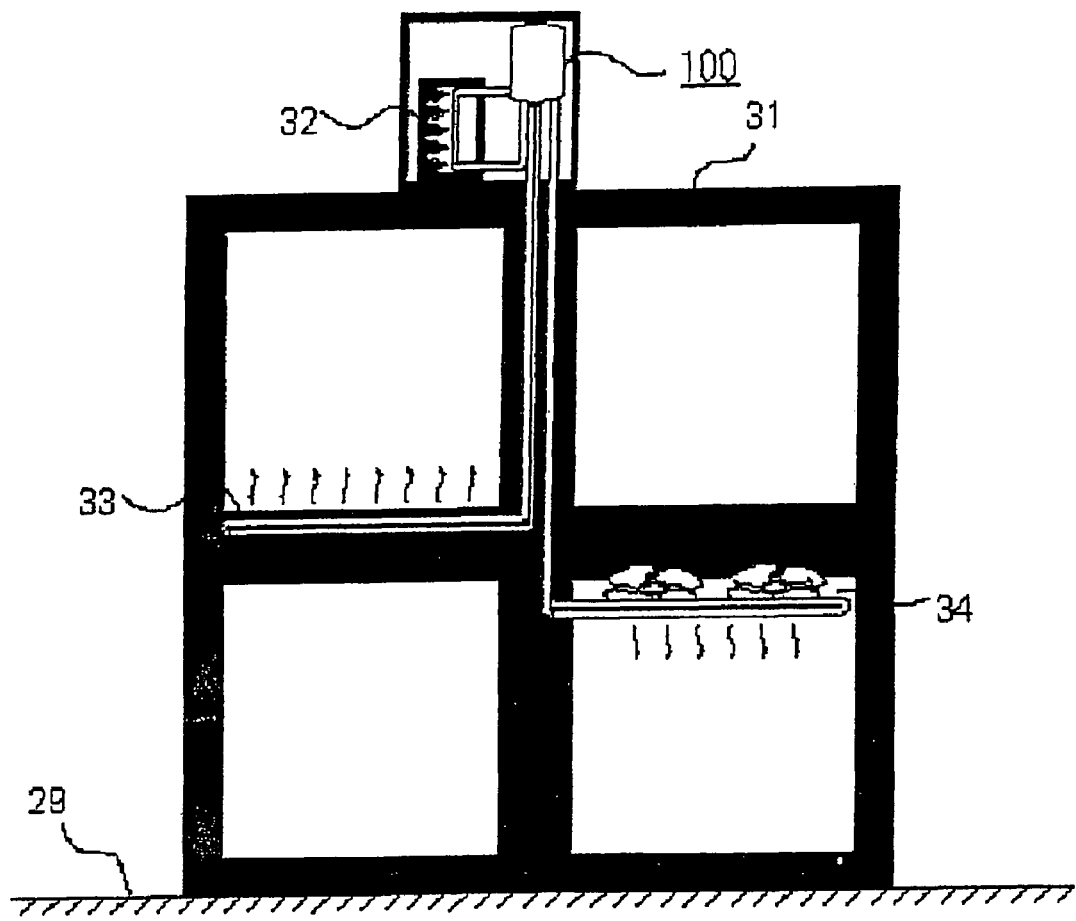
FIG. 26 shows the configurations of a building air-conditioning system and a floor heating system according to the 13th embodiment.

FIG. 26 shows a building air-conditioning system and a floor heating system as application examples. As shown in FIG. 26, a heat source 32 is installed on the rooftop of a building 31. The heat generated by the heat source 32 is transported by a heat transport apparatus 100 according to the invention and used for floor heating (indicated by numeral 33) and air-conditioning (indicated by numeral 34) of the building.

Conventionally, in many building air-conditioning systems, heat is transported downward by means of a mechanically driven pump because a heat source and a heat sink are installed on the rooftop in view of easiness of installation, maintenance, and heat emission. If the heat transport apparatus according to the invention is used as part of such a building air-conditioning system, the mechanically driven pump is made unnecessary and hence the energy that is necessary for transporting a heating medium can be reduced. Further, the noise that is generated by the mechanically driven pump can be eliminated.

On the other hand, conventionally, floor heating is performed by introducing, with a mechanically driven pump, an operating fluid whose temperature has been increased by a boiler into a flow passage that is buried in a floor. The use of the heat transport apparatus according to the invention in place of the mechanically driven pump makes it possible to save the energy and eliminate the noise generated by the mechanically driven pump.

Figure 27:
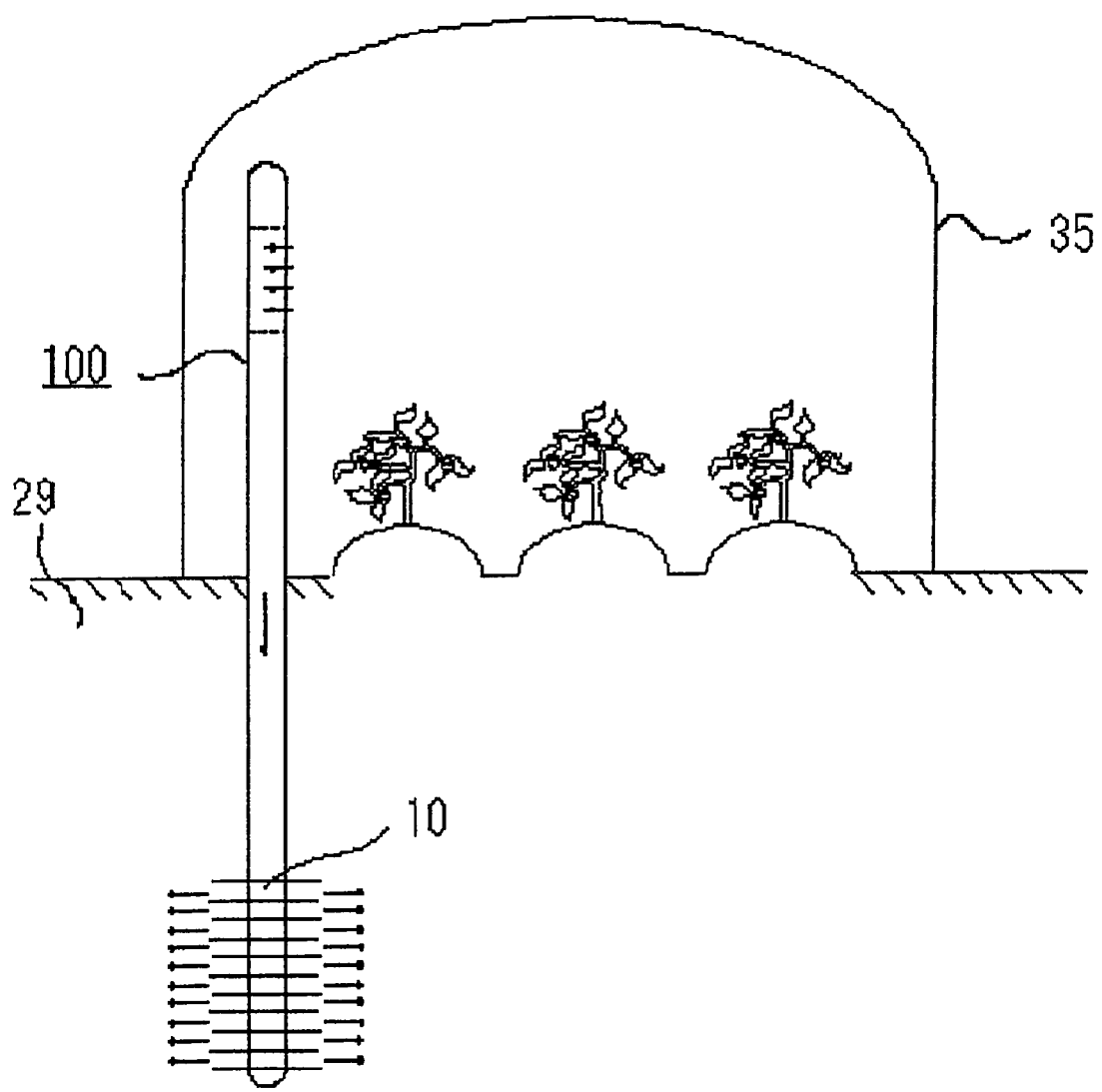
FIG. 27 shows the configuration of an air-conditioning system for greenhouse cultivation according to the 13th embodiment.

FIG. 27 shows an air-conditioning system for greenhouse cultivation as an application example. The agriculture has recently made further advancements and many farm products have come to be produced by greenhouse cultivation. Although there are cases that the temperature and humidity management is performed automatically, the temperature management in greenhouses is performed manually in most cases and is very complicated work.

Even in the latter case, as shown in FIG. 27, the temperature variation in a vinyl house 35 can be reduced by installing the sensible heat releasing heat exchanger 10 of the heat transport apparatus according to the invention in soil 29 which is superior in the uniformity of heat distribution. Conversely, the energy that is consumed by a boiler or the like that has been used so far for keeping the temperature inside a greenhouse high can be reduced by increasing the temperature utilizing geothermal energy.

Embodiment 14

Figure 28:
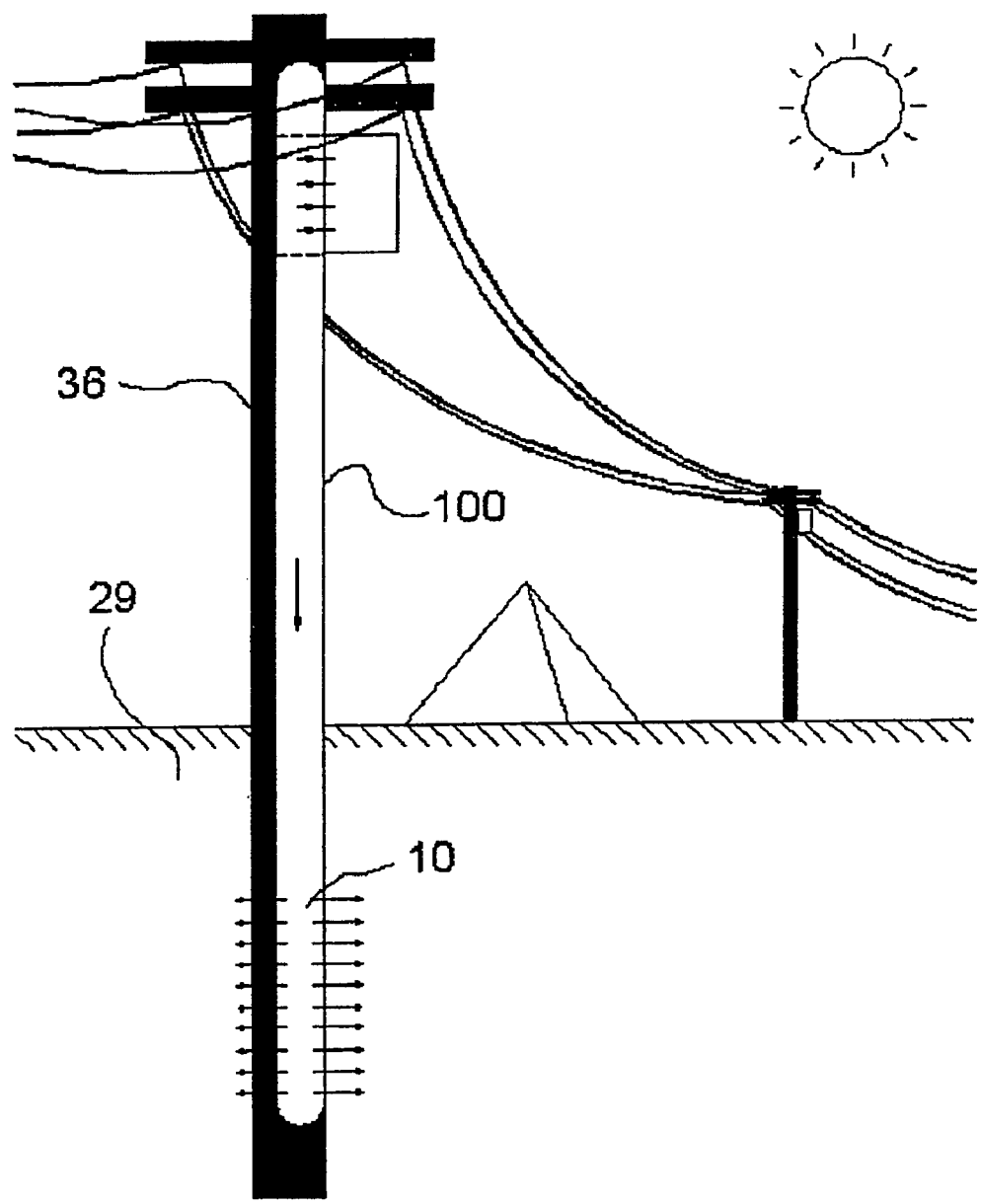
FIG. 28 shows the configuration of an outdoor measuring instrument cooling apparatus according to a 14th embodiment of the invention.

FIG. 28 shows a specific configuration of an vapor-lift-pump type heat transport apparatus according to the invention that is used as an outdoor measuring instrument cooling apparatus.

The internal heat generation density of outdoor measuring/control apparatus and transformers (e.g., a transmission/distribution line relay and a traffic jam measuring instrument) has increased because of their improvements in performance, increase in capacity, and reduction in size. Their cooling methods are now an important issue. The cooling of outdoor apparatus greatly depends on the weather and a cooling apparatus that is not influenced by the weather is now required. Air-cooling fins or the like are in many cases provided on the surface of a case, in which case problems arise that, for example, the cooling performance is lowered due to stuffing with dust etc. and the fins or the like are damaged because of bad weather (e.g., a typhoon). In desert areas, the cooling of a heating body is a serious issue because the environment temperature is very high in the daytime.

The above problems can be solved by using a heat transport apparatus 100 according to the invention as a cooling apparatus for any of the above apparatus and installing the sensible heat releasing heat exchanger 10 in soil 29 or inside a body that is hard to be destroyed such as a utility pole 36, as shown in FIG. 28.

Embodiment 15

Figure 29:
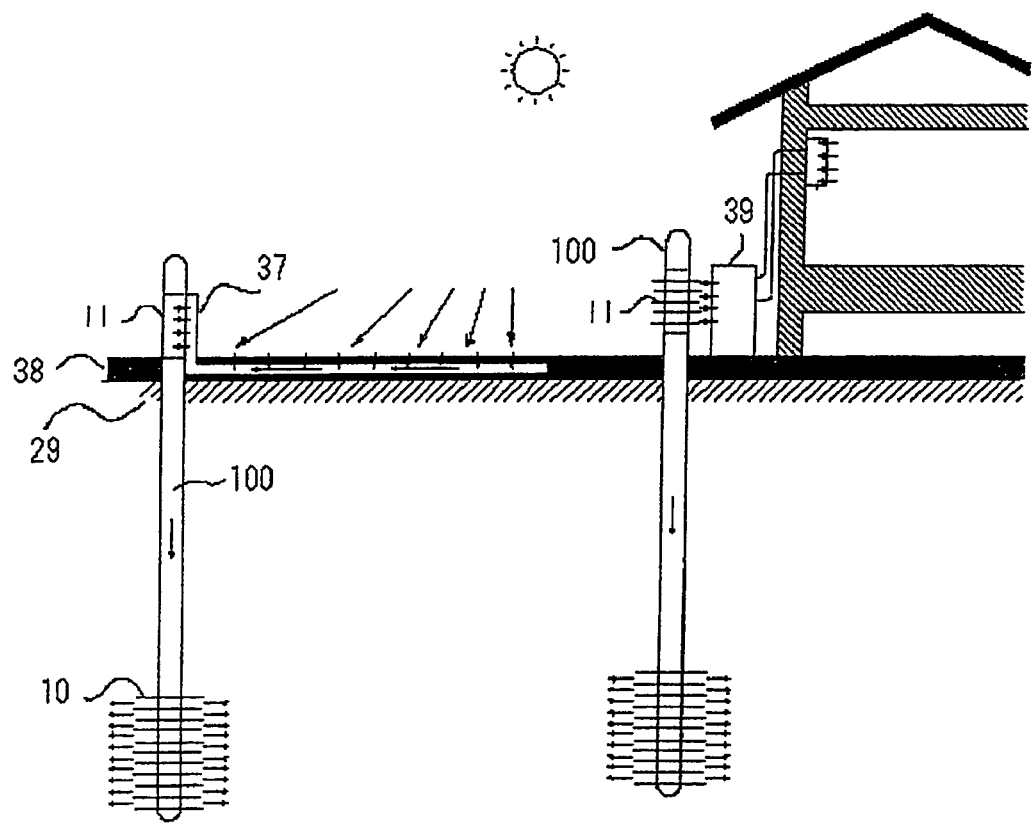
FIG. 29 shows the configuration of an application example according to a 15th embodiment of the invention that is used for suppressing a heat island phenomenon.

FIG. 29 shows a specific configuration of an vapor-lift-pump type heat transport apparatus according to the invention that is used for suppression of a heat island phenomenon.

In cities, the surface of the ground is covered with concrete or asphalt in many areas and the proportion of green tracts of land is very small. As a result, the atmospheric temperature of a city area tends to increase: what is called a heat island phenomenon.

The heat island phenomenon can be suppressed in the following manner. As shown in FIG. 29, a heat transport apparatus 100 according to the invention is used in such a manner that the heating heat exchanger 11 is provided on a road surface 38 using a heat pipe 37 or on an air-conditioner outdoor apparatus 39 and the sensible heat releasing heat exchanger 10 is provided in soil 29, a river, sewage, or the like. Heat that is carried by sunlight and household waste heat are positively transported to the ground or the like. By virtue of the reduction of the environment temperature, the power that is consumed by air-conditioning (cooling) can be reduced, which greatly contributes to $CO_2$ reduction.

Figure 30:
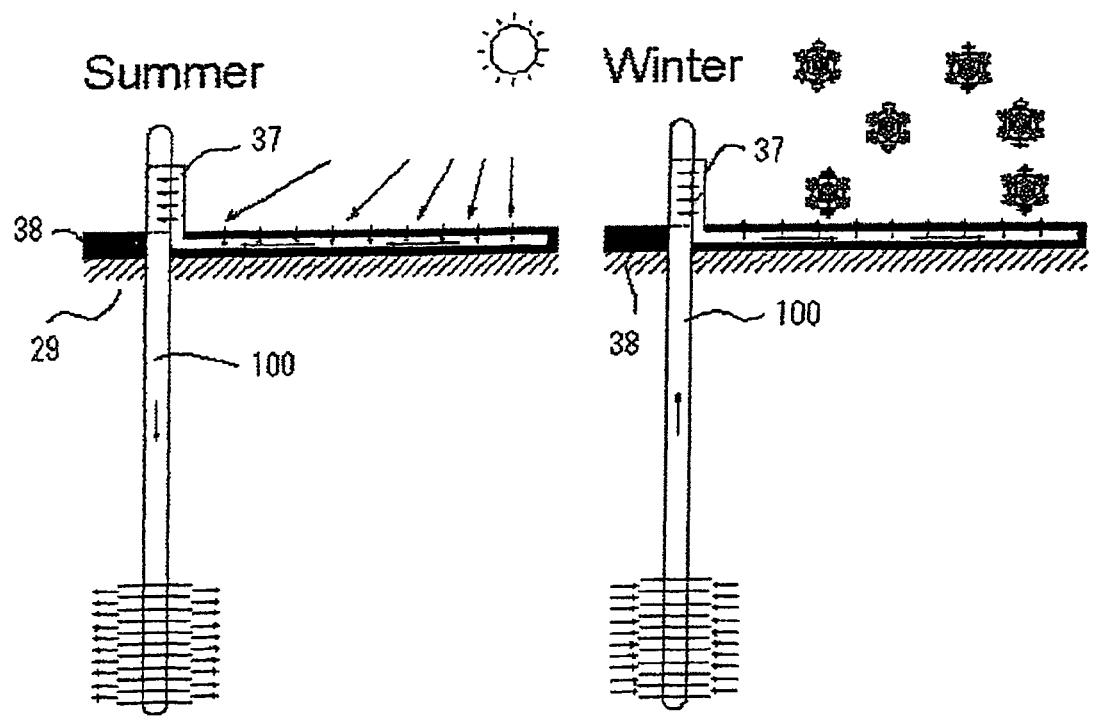
FIG. 30 shows the configuration of an application example according to the 15th embodiment that is used for seasonal snow melting or desert afforestation.

FIG. 30 shows a specific configuration of an vapor-lift-pump type heat transport apparatus according to the invention that is used for seasonal snow melting or desert afforestation.

In winter, heavy snowfall areas have snow-related problems such as slip accidents due to snow laid on roads and snow removal from roofs and roads. The heat transport apparatus according to the 10th embodiment can easily be buried in soil and can transport heat in both directions. Therefore, installing the heat transport apparatus 100 in the manner shown in FIG. 30 makes it possible to store solar energy in soil (or a dedicated heat accumulator) 29 in summer and melting accumulated snow in winter using the stored heat. This configuration provides many advantages that the apparatus operates with no load, requires no control, is maintenance-free, and can be used in places such as mountainous regions where it is difficult to obtain electric power.

Similarly, the heat transport apparatus 100 is buried in desert sand, whereby solar energy is stored in soil in the daytime and the stored energy is released to the atmosphere in the nighttime. This makes it possible to suppress a large day-night temperature variation as well as to assist desert afforestation projects because the water evaporation is suppressed.

Embodiment 16

Figure 31B:
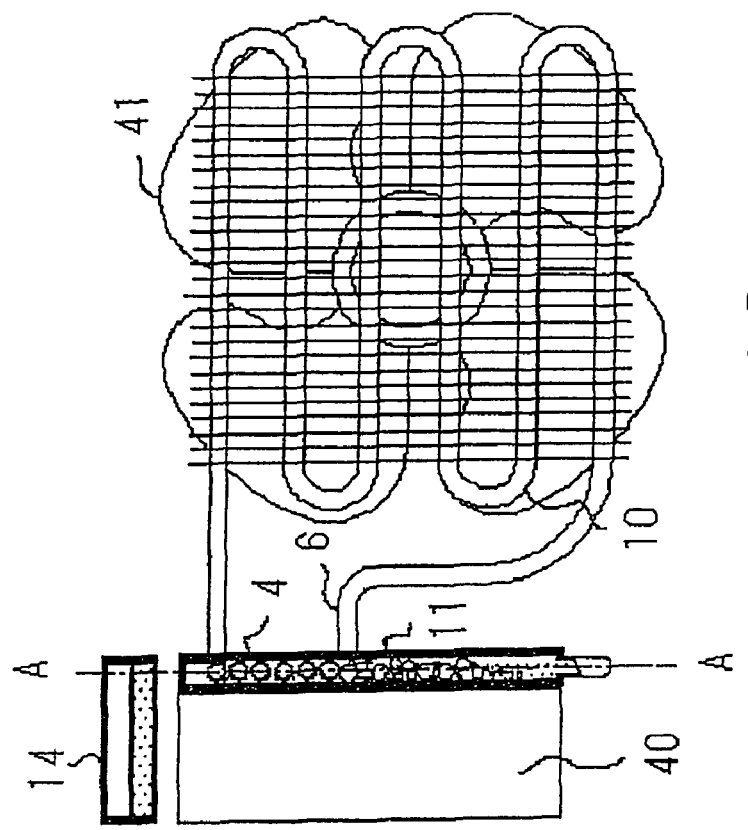
FIGS. 31A and 31B show the configuration of a pumpless water cooling system according to a 16th embodiment of the invention.
Figure 31A:
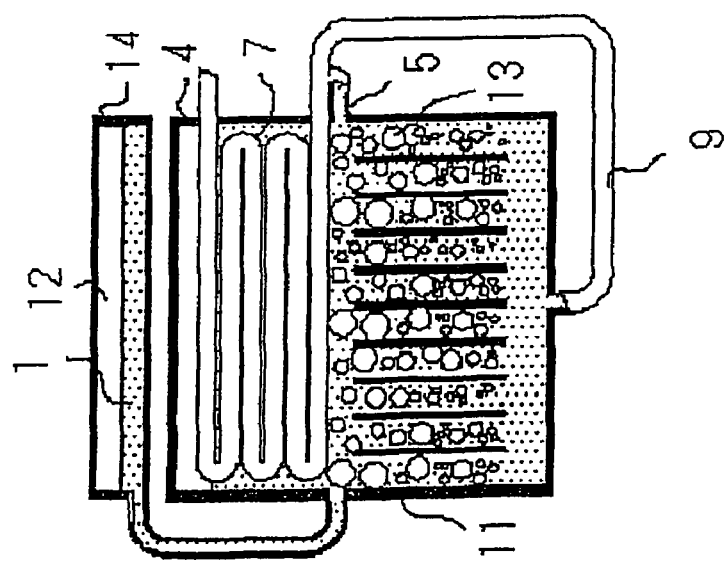

FIGS. 31A and 31B show a specific configuration of a pumpless water cooling system that employs an vapor-lift-pump type heat transport apparatus according to the invention.

The amount of heat generated by electronic apparatus mounted on trains and automobiles are increasing year by year and the current situation is such that conventional air cooling is insufficient and water cooling is required. However, the transition from an air cooling system to a water cooling system is associated with many problems: cost increase, the restrict ion of the installation location (mainly due to the pump installation location and the necessity of shortening of a cooling water pipe), the reliability issue, the necessity of maintenance, etc. The use of the heat transport apparatus according to the invention dispenses with a circulation pump and hence requires no space for its installation. Further, since the heat transport apparatus according to the invention can be installed in a flexible manner, the restriction of the installation location can be relaxed.

FIGS. 31A and 31B show a specific configuration according to this embodiment. The first space, the heating heat exchanger 11, a distribution container, and a collection container are integrated together and provided in an electric equipment unit 40. The sensible heat releasing heat exchanger 10 is attached to a fan 41. This configuration makes it possible to realize a highly reliable, compact water cooling system at a low cost. In conventional cooling systems, convection heat transmission is utilized to transport heat from a heating body to cooling water. The heat transmission surface needs to be provided with many fins to increase the heat transmission area and the cost is increased by manufacture of the fins. In contrast, in the invention, the heat transmission characteristic is good by virtue of use of the heat transmission by convection of a boiled solution and the manufacture of fins is not always necessary for this portion. The cost can thus be reduced.

Embodiment 17

Figure 32:
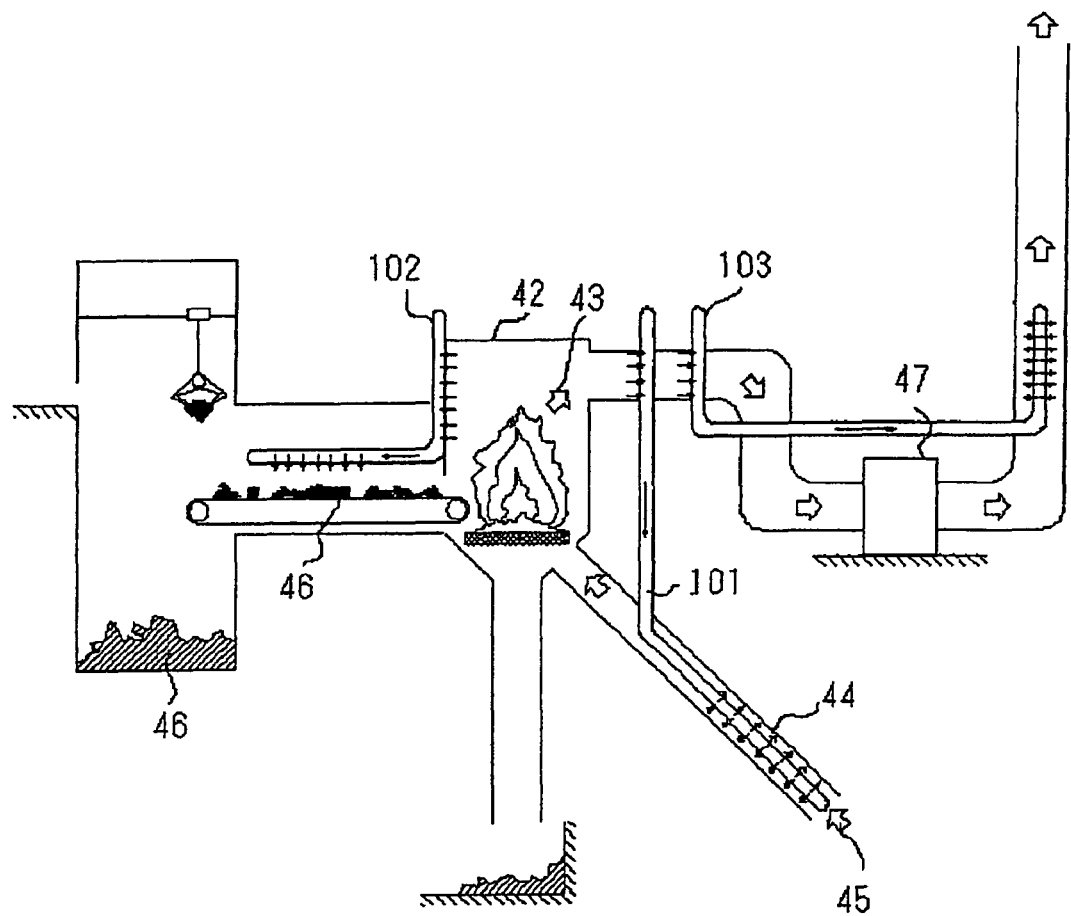
FIG. 32 shows the configuration of a high-efficiency incinerator according to a 17th embodiment of the invention.

FIG. 32 show a specific configuration of a high-efficiency incinerator that employs vapor-lift-pump type heat transport apparatus according to the invention.

In general, incinerators take in low-temperature fresh air and exhausts high-temperature gas generated by combustion utilizing the chimney effect. The combustion temperature and the combustion efficiency are low because of the intake of low-temperature air, and a tall chimney needs to be installed.

As shown in FIG. 32, with a heat transport apparatus 101 according to the invention, the thermal energy retained by high-temperature gas 43 that is output from a combustion chamber 42 is given to air 45 that is taken in through a ventilation passage 44, whereby high-temperature fresh air is supplied naturally to the combustion chamber 42. With a heat transport apparatus 102 according to the invention, the thermal energy retained by the high-temperature gas 43 is given to refuse 46 being transported to the combustion chamber 42. The refuse 46 is thereby heated preliminarily and dehydrated, as a result of which the combustion efficiency can be increased. It is not necessary to install a tall chimney. Further, the above configuration increases the combustion temperature and hence can suppress the generation of harmful dioxin, which is a problem particularly in small incinerators.

In large incinerators, a chemical processing machine 47 is provided to remove toxic components from exhaust gas and the temperature of the exhaust gas needs to be reduced there several times. For final discharge of the exhaust gas, the exhaust gas is heated again and thereby converted into a high-temperature gas. A heat transport apparatus 103 according to the invention is used in this section to transport the thermal energy retained by the high-temperature gas 43 to the exhaust gas to be discharged finally. This contributes to effective use of the thermal energy. Although not shown in FIG. 32, the heat that is produced in removing toxic components may be transported by another heat transport apparatus according to the invention so as to be given to exhaust gas to be discharged finally. This also contributes to effective use of the thermal energy.

Further, it is possible to refine low-melting-point metals of collected empty cans by utilizing the energy produced by combustion by using a heat transport apparatus according to the invention. A high-efficiency refinery can be constructed in which refuse collection and refining operation are fused together.

Still further, coupling a power generation system (utilizing the circulation of the heat exchange circulating solution 1) to a heat transport apparatus according to the invention makes it possible to perform refuse power generation.

Embodiment 18

Figure 33:
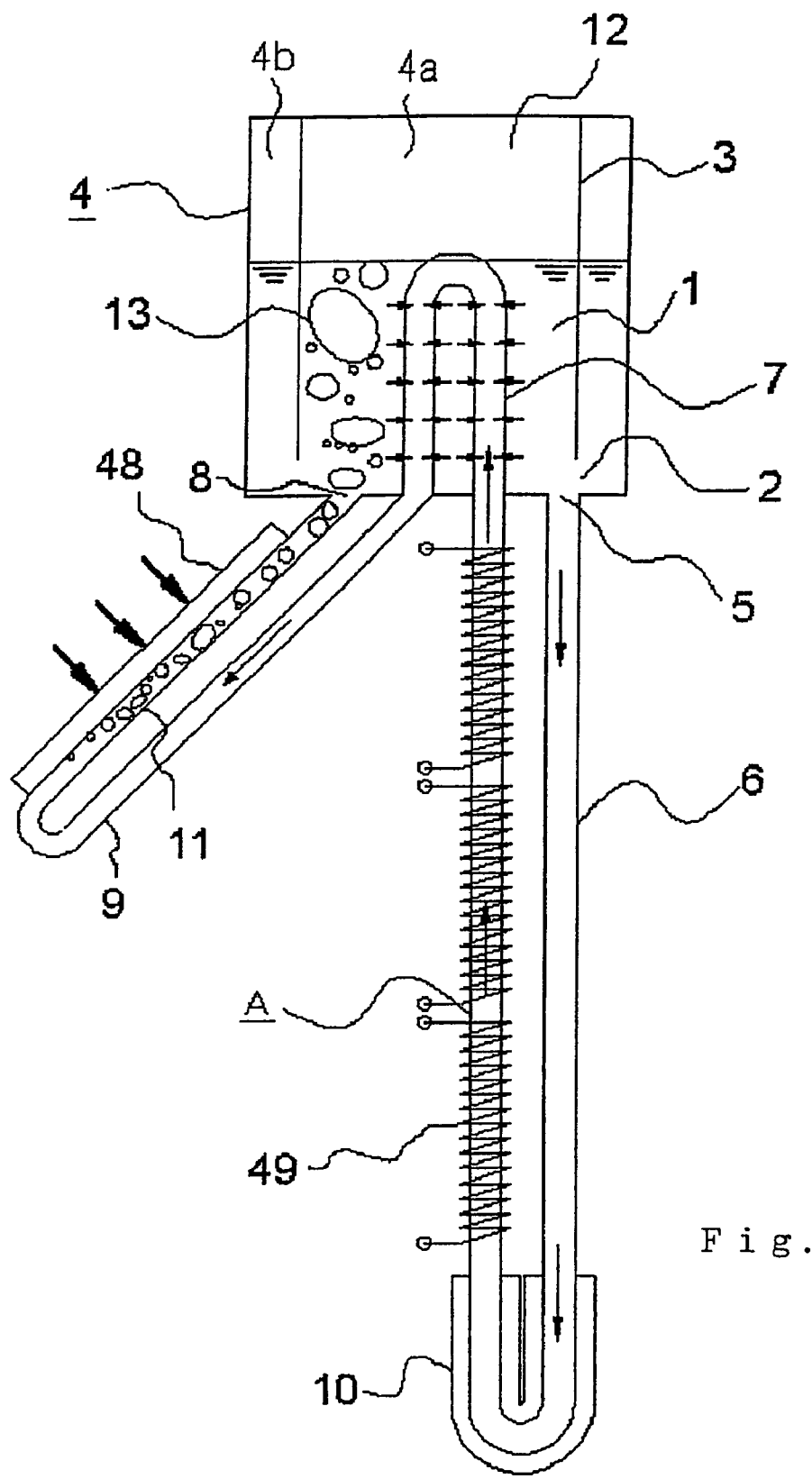
FIG. 33 shows the configuration of a hybrid heat utilization system according to an 18th embodiment of the invention.

FIG. 33 shows the configuration of a hybrid heat utilization system that employs an vapor-lift pump type heat transport apparatus according to the invention.

As shown in FIG. 33, the heating heat exchanger 11 of a heat transport apparatus according to the invention is attached to a solar panel 48 and a magnetic fluid, for example, is confined as the heat exchange circulating solution 1. Lead wires 49 are wound on the circulating solution transport pipe A. With this configuration, not only can the power generation capability of the solar panel 48 be prevented by lowering the temperature of the solar panel 48 but also electric power can be generated because circulation of the heat exchange circulating solution 1 induces currents flowing through the lead wires 49. Further, the sensible heat releasing heat exchanger 10 may be disposed so as to be in contact with a heat accumulator (e.g., water in a heat insulating container). The stored heat can be used for another purpose (e.g., as warm water for home use).

Embodiment 19

Figure 34:
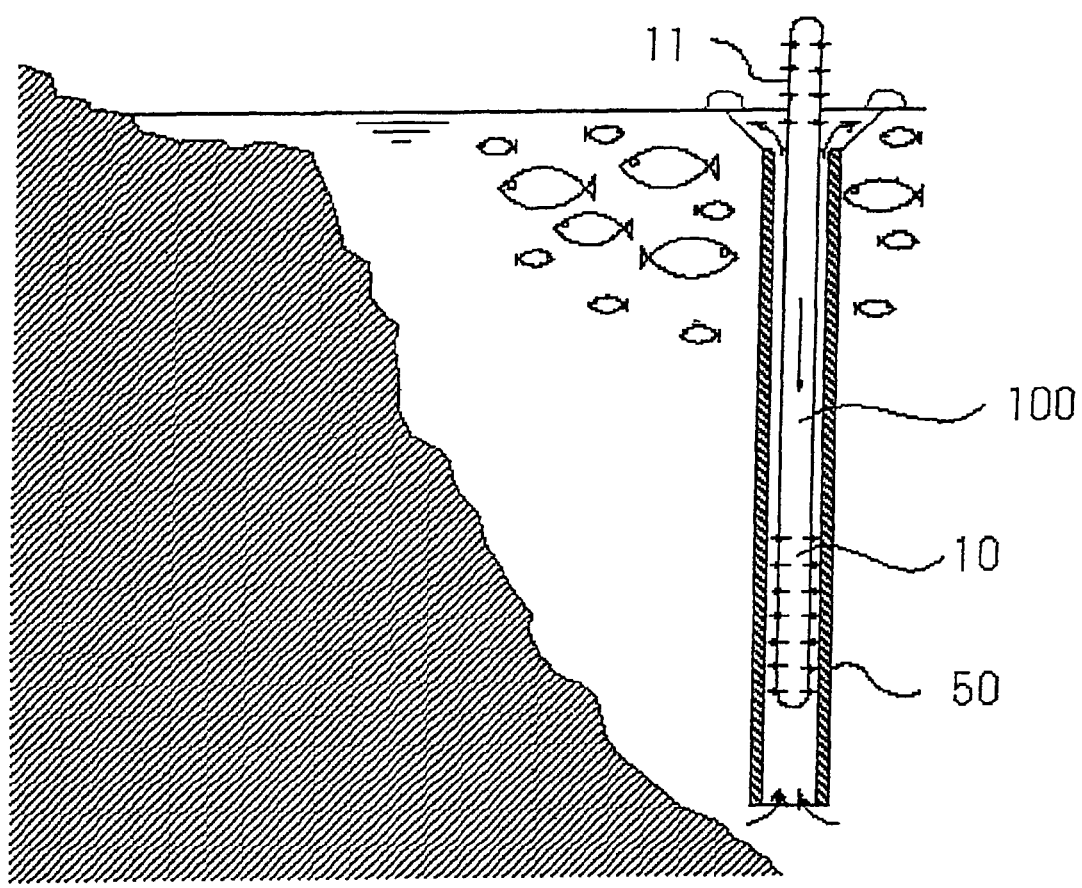
FIG. 34 shows the configuration of an application example according to a 19th embodiment of the invention that is used for drawing deep-sea water.

FIG. 34 shows a specific configuration of an application example in which an vapor-lift pump type heat transport apparatus according to the invention is used for drawing deep-sea water which is now attracting much attention for artificial construction of good fisheries and for use as drinking and cosmetics materials.

As shown in FIG. 34, the heating heat exchangers 11 of a heat transport apparatus 100 according to the invention is installed in high-temperature seawater of a shallow part of the sea or in the air on which sunlight shines. The sensible heat releasing heat exchanger 10 is provided in a bottom portion of a cylindrical pipe 50 that is disposed so as to connect deep-sea water and the surface of the sea. With this configuration, the deep-sea water inside the bottom portion of the cylindrical pipe 50 is increased in temperature and elevated naturally through the cylindrical pipe 50 because of the buoyancy produced by the density difference between the deep-sea water and the ambient low-temperature seawater. The deep-sea water can thus be drawn easily.

Embodiment 20

Figure 35:
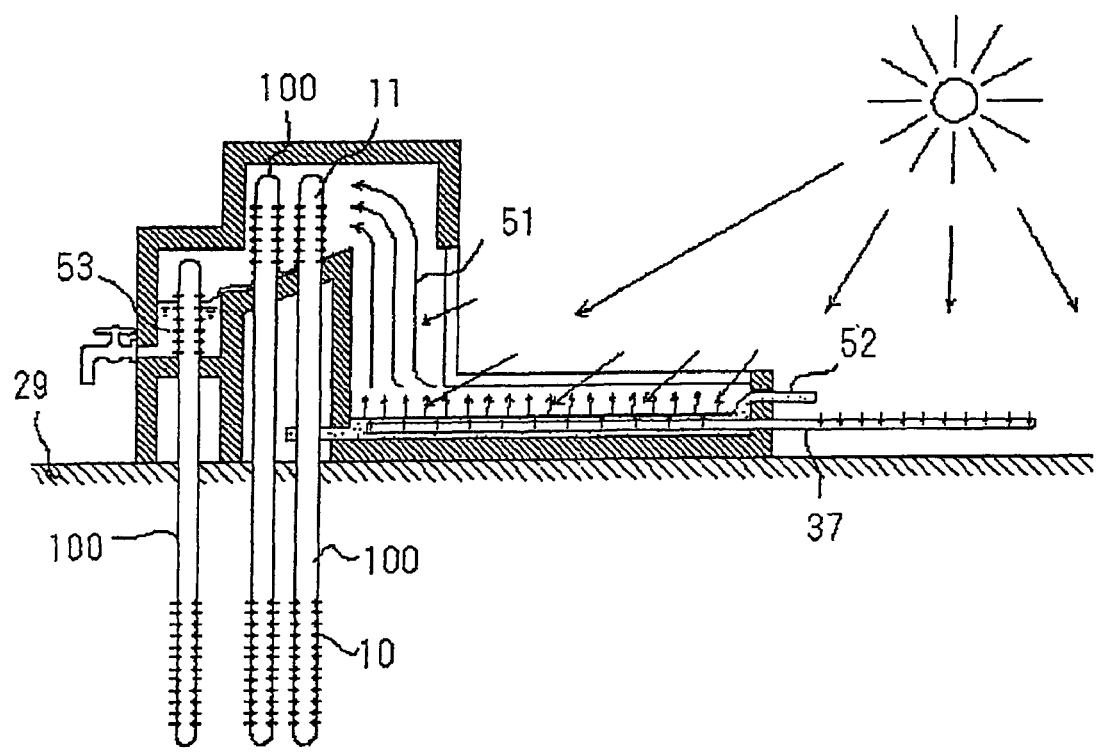
FIG. 35 shows the configuration of a desalination plant as an application example according to a 20th embodiment of the invention.

FIG. 35 shows a specific configuration of a desalination plant that employs an vapor-lift pump type heat transport apparatus according to the invention.

The technology of desalinating seawater by evaporating it utilizing sunlight and condensing generated vapor in a separate container is widely used. However, no heat sink for condensation exists in many of regions where desalination is performed.

As shown in FIG. 35, the heating heat exchangers 11 of a heat transport apparatus 100 according to the invention are installed in a passage of vapor 51 that is produced by evaporating seawater 52 by sunlight and the sensible heat releasing heat exchangers 10 of the heat transport apparatus 100 are installed in soil 29. Utilizing cold energy in the soil 29 makes it possible to desalinate the seawater 52 into fresh water 53 at high efficiency. Desalination can be performed at any location.

Low-temperature seawater may be used instead of soil as a heat sink.

A portable emergency desalination apparatus for use at the time of an accident can be implemented similarly.

Embodiment 21

Figure 36:
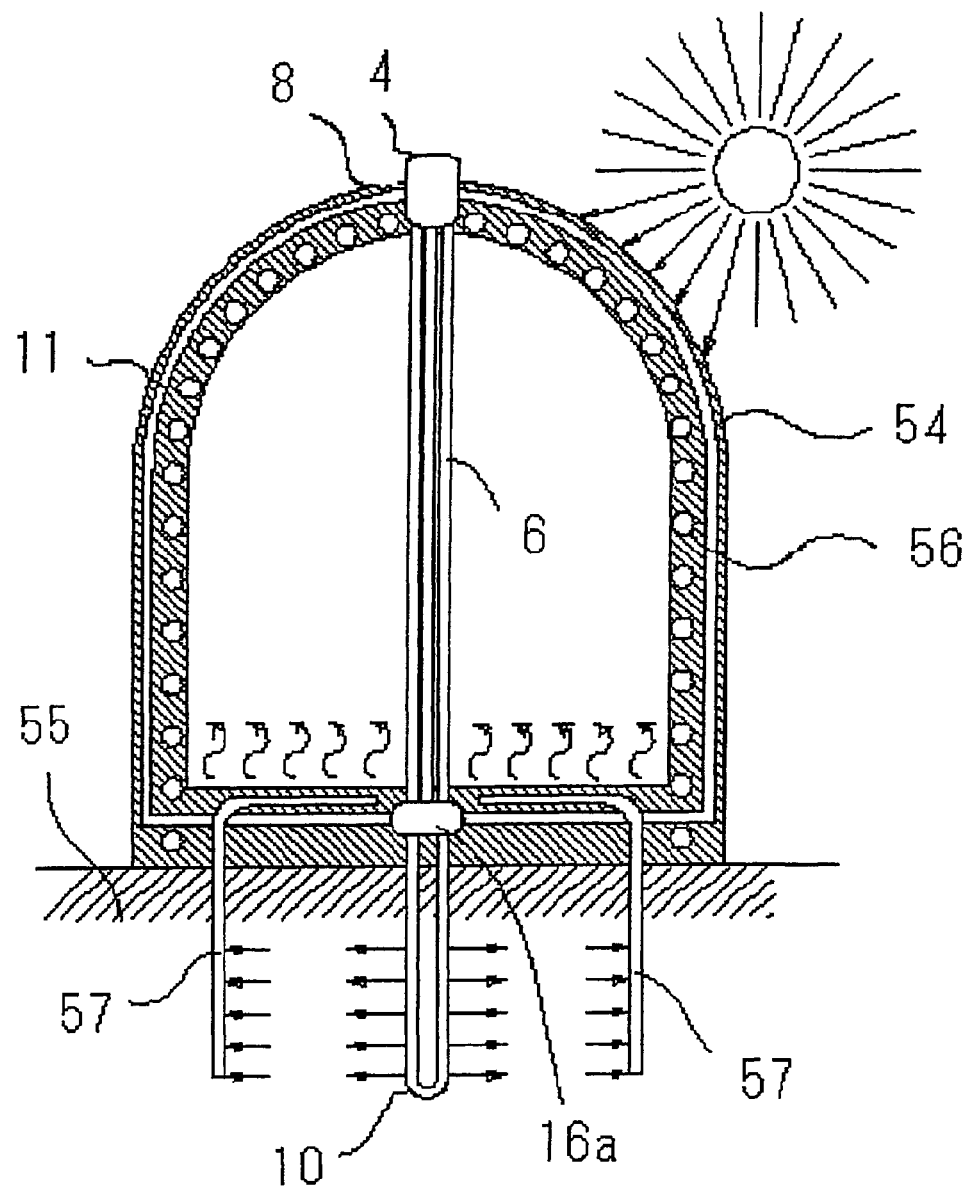
FIG. 36 shows the configuration of an application example according to a 21st embodiment in which the invention is applied to construction of lunar living quarters.
Figure 37:
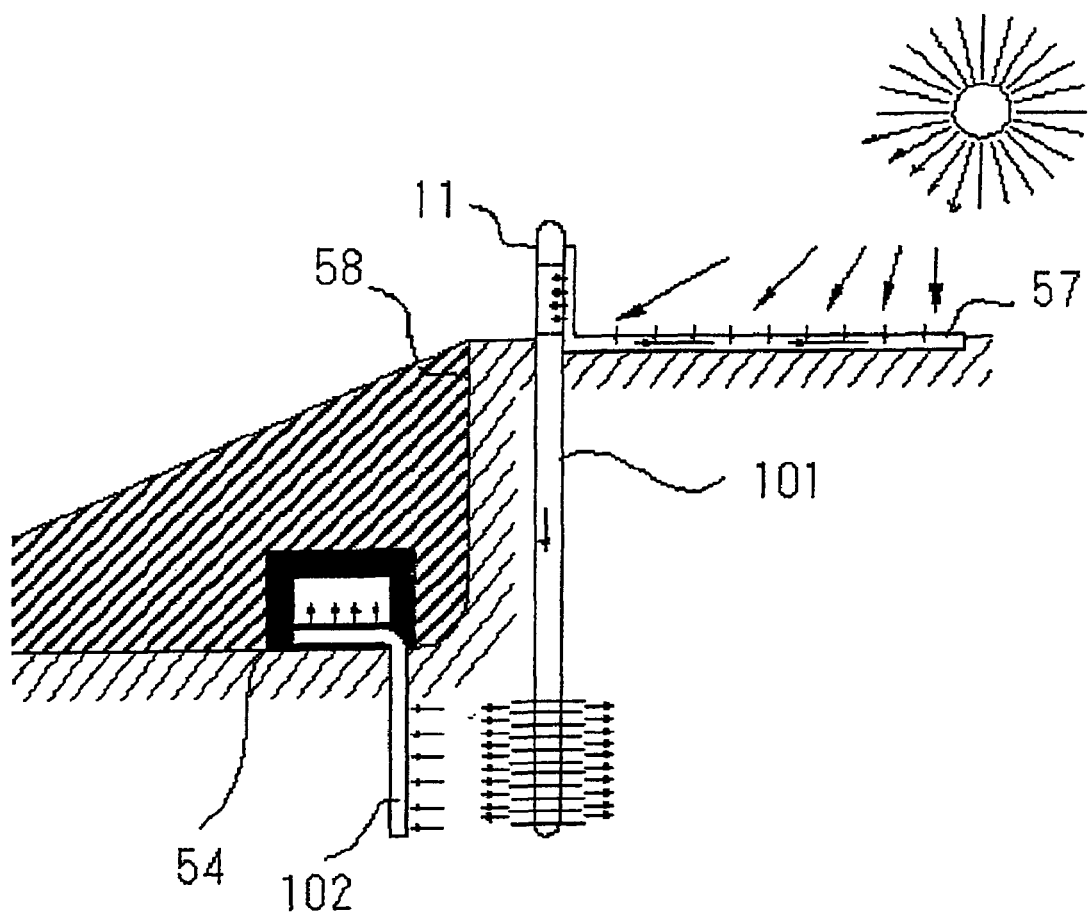
FIG. 37 shows the configuration of another application example according to the 21st embodiment in which the invention is applied to construction of lunar living quarters.

FIGS. 36 and 37 show specific configurations of examples in which an vapor-lift pump type heat transport apparatus according to the invention is used for construction of lunar living quarters.

The development of the space aviation technologies has made it possible to send humans to the moon. However, a temperature variation of about 300 K occurs on the moon's surface temperature: the temperature increases to 150° C. or more with incidence of sunlight and may decrease to −150° C. or less without incidence of sunlight. As a result, ordinary solid bodies are destroyed by thermal stress and the moon's surface is like a desert. Therefore, even if some structure is constructed on the moon's surface, its life will be short.

FIG. 36 shows an example in which a heat transport apparatus according to the invention is used in such a manner that the heating heat exchanger 11 is buried in the wall and roof of a structure 54 and the sensible heat releasing heat exchanger 10 is buried in the ground of the moon's surface 55 so as to use the ground as a heat accumulator. This makes it possible to reduce the temperature variation of the ground to thereby increase the life of the structure. In this case, as shown in FIG. 36, to reduce the range of the circumferential temperature distribution, it is desirable that a loop heat pipe 56 be disposed inside or outside the heating heat exchanger 11. The heat stored in the ground by the heat pipe 57 may be transported to the floor of the structure 54.

If a structure 54 is constructed in a space that is always in the shadow of a crater 58, the temperature variation will be small and the life of the structure 54 will be increased. However, to enable human habitation, the internal temperature of the structure 54 should be kept approximately the same as the environment temperature of the earth. One method for that purpose is to generate electric power using a solar panel and control the internal temperature using that electric power. However, should that system fails, the internal temperature will decrease to −150° C. or less. In view of the above, as shown in FIG. 37, a temperature compensation system for the structure 54 may be provided in the following manner. The heating heat exchanger 11 is disposed on a ground surface or a surface layer that receives sunlight. A heat transport apparatus 101 according to the invention stores solar energy incident on the surface, and a heat transport apparatus 102 according to the invention, a heat pipe, or the like transports the heat stored in the ground to the structure 54. This system makes it possible to reduce the energy that is used for the internal temperature control and to secure a minimum temperature environment that allows human habitation even in case of an emergency.

The above-described techniques enable human habitation on the moon's surface and promote the space aviation, astronomical observation, and zero-gravity processing technologies.

Embodiment 22

The heat transport apparatus according to the invention can also be applied to construction of a recycling-oriented society system.

Studies are now being made of a recycling-oriented society system, in particular, an energy long-distance transport technology, as an energy saving method and one of countermeasures against the global warming. However, conventional heat transport technologies are hard to implement because of problems relating to the use of energy and the height difference. The invention makes it possible to realize cities with high-efficiency energy circulation that are connected to each other by heat transport apparatus according to the invention because the heat transport apparatus according to the invention can transport heat in every direction with no motive power and vertical snaking of a flow passage is not problematic because of the sensible heat transport.

Embodiment 23

The heat transport apparatus according to the invention can also be applied to the utilization of basements in connection with the construction of high-rise houses. Although the desire for acquisition of a house is still high at the present time, it is very difficult to find a convenient piece of land and the prices of land for construction of houses are still high. In these circumstances, many houses whose total floor spaces are wide though the land areas are small have come to be constructed with a transition from two-story houses which were common previously to three and four-story houses. However, no advancements have been made so far in the utilization of basements though it has been intended. This is because underground spaces tend to be humid because of difficulty in ventilation and hence are not suitable for not only living spaces but also storage spaces.

Figure 38:
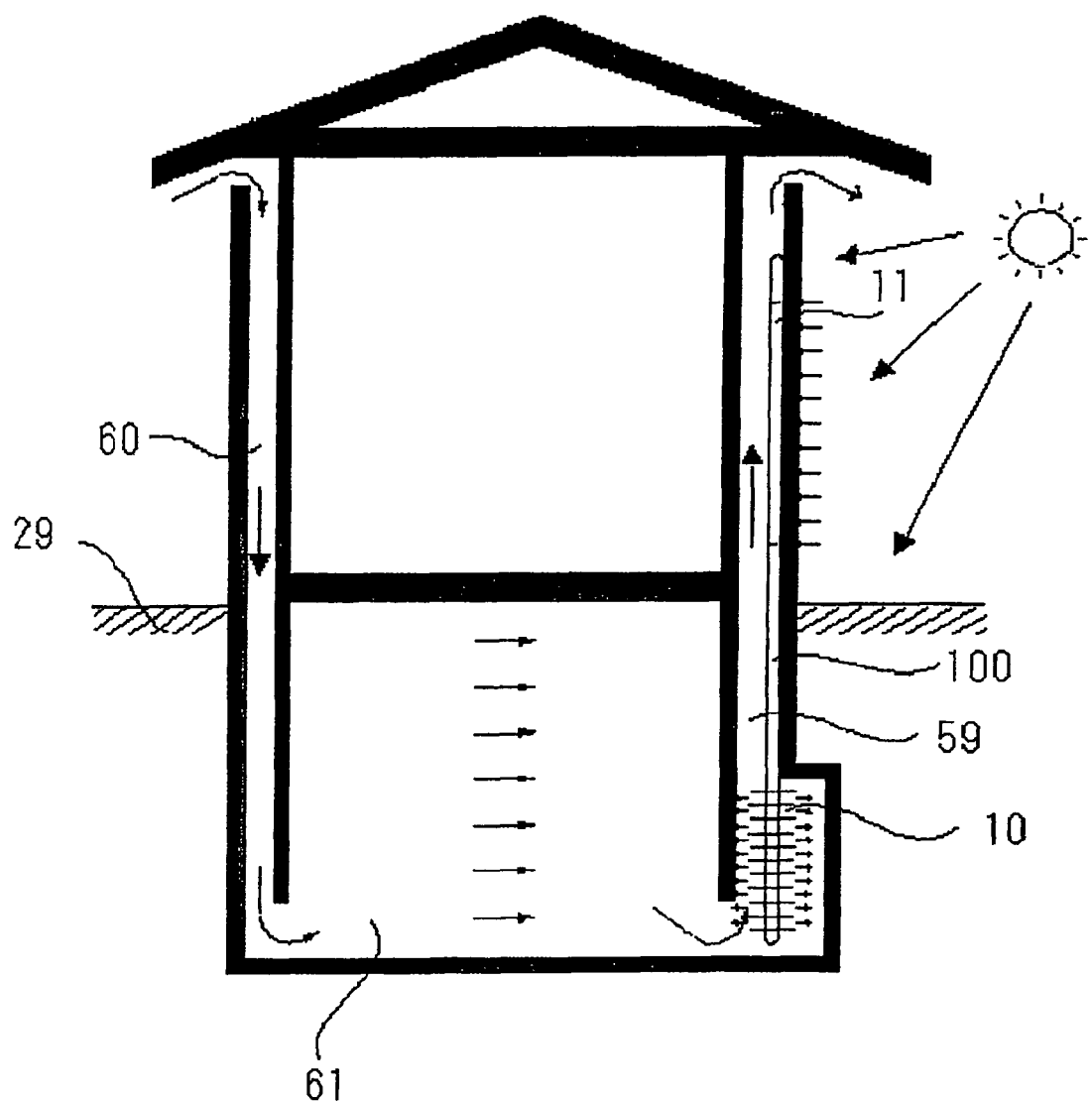
FIG. 38 shows the configuration of an application example according to a 23rd embodiment that utilizes a basement.

FIG. 38 shows an example in which passages 59 and 60 are formed in walls of a house so as to communicate with the basement 61 and the rooftop. A heat transport apparatus 100 according to the invention is installed in the one passage 59 in such a manner that the heating heat exchanger 11 is attached to the wall surface and the sensible heat releasing heat exchanger 10 is disposed in the bottom portion of the passage 59. With this configuration, the temperature of the air in the bottom portion of the passage 47 is increased and the heat and the air are transported to the rooftop through the passage 59 (chimney effect). Since fresh air is introduced into the basement 61 through the other passage 60 which communicates with the basement 61, the basement 61 does not become a space that is humid and contains stale air. The invention can provide a comfortable living space underground.

Embodiment 24

The heat transport apparatus according to the invention can also be applied to the cooling of electronic apparatus such as personal computers. In current personal computers that have large heat generation rates, heat emission by forced air cooling is performed by using a fan. Although fans are being improved in silence, further increase in silence is desired.

Effective heat emission can be attained without a fan by disposing the sensible heat releasing heat exchanger 10 which is of a natural air cooling type in a wide bottom or side space of a personal computer and the CPU which generates heat is attached to the vapor-liquid two-phase fluid inflow pipe 9. A case wall may be used as the sensible heat releasing heat exchanger 10. In this manner, a fanless heat emission system can be constructed and a low-noise personal computer can be provided.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A vapor-lift pump heat transport apparatus comprising:
a heat exchange circulating solution container that contains a heat exchange circulating solution and vapor of the heat exchange circulating solution;
solution outlets through which the heat exchange circulating solution is output from the container, the solution outlets being located at opposite ends of the container;
a two-phase fluid inlet through which a two-phase fluid consisting of the heat exchange circulating solution at a high temperature and vapor bubbles of the heat exchange circulating solution is input into the container; and
a first transport passage connected to the solution outlets and including a sensible heat releasing heat exchanger, a second transport passage through which an inside heat exchange circulating solution exchanges heat with the heat exchange circulating solution in the container or with the heat exchange circulating solution and the vapor of the heat exchange circulating solution in the container, and a third transport passage connected to the two-phase fluid inlet and including a heating heat exchanger, wherein
both of the first and third transport passages are connected to the second transport passage, and
the first transport passage includes two branches connected to two respective solution outlets and which merge at an intermediate position into a trunk passage that is connected to the second transport passage.

2. The vapor-lift pump heat transport apparatus according to claim 1, wherein a portion of the third transport passage, located at the heating heat exchanger, is divided into a plurality of parts forming parallel flow passages.

3. The vapor-lift pump heat transport apparatus according to claim 2, including a plurality of the two-phase fluid inlets.

4. The vapor-lift pump heat transport apparatus according to claim 1, wherein the second transport passage includes a plurality of circulating solution transport pipes, a distribution container disposed upstream of the circulating solution transport pipes, and a collection container disposed downstream of the circulating solution transport pipes.

5. The vapor-lift pump heat transport apparatus according to claim 1, wherein the heat exchange circulating solution container contains a non-condensed gas mixed with the vapor of the heat exchange circulating solution.

6. The vapor-lift pump heat transport apparatus according to claim 2, wherein the heat exchange circulating solution container contains a non-condensed gas mixed with the vapor of the heat exchange circulating solution.

7. The vapor-lift pump heat transport apparatus according to claim 3, wherein the heat exchange circulating solution container contains a non-condensed gas mixed with the vapor of the heat exchange circulating solution.

8. The vapor-lift pump heat transport apparatus according to claim 4, wherein the heat exchange circulating solution container contains a non-condensed gas mixed with the vapor of the heat exchange circulating solution.

* * * * *